US012291896B2

(12) United States Patent
Hanley

(10) Patent No.: US 12,291,896 B2
(45) **Date of Patent: *May 6, 2025**

(54) DRAWER ASSEMBLY

(71) Applicant: DEJANA TRUCK AND UTILITY EQUIPMENT CO., INC., Kings Park, NY (US)

(72) Inventor: Charles L. Hanley, North Smithfield, RI (US)

(73) Assignee: Dejana Truck and Utility Equipment Co., Inc., Kings Park, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/302,398

(22) Filed: Apr. 18, 2023

(65) Prior Publication Data

US 2023/0250677 A1 Aug. 10, 2023

Related U.S. Application Data

(63) Continuation of application No. 17/152,201, filed on Jan. 19, 2021, now Pat. No. 11,661,767.

(51) Int. Cl.

| | |
|---|---|
| ***E05B 65/46*** | (2017.01) |
| ***A47B 95/02*** | (2006.01) |
| ***E05C 3/14*** | (2006.01) |

(52) U.S. Cl.

CPC ................ *E05B 65/46* (2013.01); *E05C 3/14* (2013.01); *A47B 95/02* (2013.01); *A47B 2095/024* (2013.01); *A47B 2210/0016* (2013.01)

(58) Field of Classification Search

CPC ... A47B 88/50; A47B 95/02; A47B 2095/021; A47B 2095/022; A47B 2095/024; A47B 2210/0016; A47B 2210/0018; E05B 65/46; E05C 3/14

See application file for complete search history.

(56) References Cited

U.S. PATENT DOCUMENTS

| | | | |
|---|---|---|---|
| 1,720,260 | A | 7/1929 | Bowen et al. |
| 2,729,498 | A | 1/1956 | Law |
| 2,784,027 | A | 3/1957 | Temp |

(Continued)

FOREIGN PATENT DOCUMENTS

| | | | |
|---|---|---|---|
| EP | 2253432 | B1 | 3/2019 |
| JP | 2011212274 | A | 10/2011 |
| WO | 2008018799 | A1 | 2/2008 |

*Primary Examiner* — Andrew Roersma

(74) *Attorney, Agent, or Firm* — Sorell, Lenna & Schmidt, LLP

(57) ABSTRACT

A drawer assembly includes a member having a first locking element. A drawer includes a frame and a handle. The handle includes a first portion and a second portion. The first portion is coupled to the frame. The second portion is coupled to the first portion. A drawer release includes a first end and a second end. The drawer release is rotatably coupled to the drawer. The first end includes a second locking element. The second portion is rotatable relative to the first portion to move the drawer release from a first orientation in which the second locking element directly engages the first locking element to prevent the drawer from sliding relative to the member to a second orientation in which the second locking element is spaced apart from the first locking element to allow the drawer to slide relative to the member. Systems and methods of use are disclosed.

17 Claims, 29 Drawing Sheets

(56) References Cited

U.S. PATENT DOCUMENTS

| | | | |
|---|---|---|---|
| 2,825,617 | A | 3/1958 | Morgan |
| 3,133,768 | A | 5/1964 | Markline |
| 3,589,768 | A | 6/1971 | Wilson |
| 3,757,967 | A | 9/1973 | Colbridge |
| 4,030,609 | A | 6/1977 | Liebetrau et al. |
| 4,131,203 | A | 12/1978 | Bridges |
| 4,482,066 | A | 11/1984 | Dykstra |
| 4,705,315 | A | 11/1987 | Cherry |
| 4,889,377 | A | 12/1989 | Hughes |
| 4,899,895 | A | 2/1990 | Espasandin et al. |
| 4,917,430 | A | 4/1990 | Lawrence |
| 4,950,123 | A | 8/1990 | Brockhaus |
| 5,064,335 | A | 11/1991 | Tardiff |
| 5,269,447 | A | 12/1993 | Gower et al. |
| 5,470,144 | A | 11/1995 | Wen |
| 5,571,256 | A | 11/1996 | Good et al. |
| 5,775,140 | A | 7/1998 | Hallsten |
| 5,845,952 | A | 12/1998 | Albertini et al. |
| 5,988,722 | A | 11/1999 | Parri |
| 6,065,792 | A | 5/2000 | Sciullo et al. |
| 6,244,646 | B1 | 6/2001 | Wheeler, III et al. |
| 6,328,365 | B1 | 12/2001 | Adsit |
| 6,390,525 | B2 | 5/2002 | Carpenter et al. |
| 6,431,615 | B1 | 8/2002 | Bastian |
| 6,527,353 | B1 | 3/2003 | Bradfish et al. |
| 6,547,289 | B1 | 4/2003 | Greenheck et al. |
| 6,659,524 | B1 | 12/2003 | Carlson |
| 6,659,577 | B2 | 12/2003 | Lauchner |
| 6,702,342 | B2 | 3/2004 | Molzer |
| 6,715,807 | B2 | 4/2004 | Molzer |
| 6,758,508 | B2 | 7/2004 | Weyhrich |
| 6,834,923 | B2 | 12/2004 | Young et al. |
| 6,868,703 | B2 | 3/2005 | Molzer |
| 6,938,967 | B2 | 9/2005 | Dubon et al. |
| 6,997,527 | B2 | 2/2006 | Cheng |
| 7,048,347 | B1 | 5/2006 | Liu |
| 7,121,603 | B2 | 10/2006 | Stevenson et al. |
| 7,124,475 | B2 | 10/2006 | Jeffries |
| 7,152,889 | B2 | 12/2006 | Jeffries |
| 7,219,952 | B2 | 5/2007 | Taylor |
| 7,232,172 | B2 | 6/2007 | Kiester et al. |
| 7,258,317 | B1 | 8/2007 | Nagel |
| 7,338,110 | B1 | 3/2008 | Eckloff |
| 7,455,312 | B2 | 11/2008 | Senatore |
| 7,604,307 | B2 | 10/2009 | Greenwald et al. |
| 7,712,812 | B2 | 5/2010 | Gagliano |
| 7,780,254 | B2 | 8/2010 | Wang et al. |
| 8,104,851 | B2 | 1/2012 | Lu |
| 8,132,875 | B2 | 3/2012 | Juang |
| 8,523,301 | B1 * | 9/2013 | Britson .................. E05B 65/46 312/334.47 |
| 8,763,820 | B2 | 7/2014 | Hanley |
| 9,010,830 | B2 * | 4/2015 | Hanley .................. B60R 11/00 296/24.44 |
| 9,233,647 | B1 | 1/2016 | Hanley et al. |
| 9,381,872 | B2 | 7/2016 | Hanley |
| 9,386,847 | B1 | 7/2016 | Jeffries |
| 9,504,323 | B1 | 11/2016 | Porreca |
| 9,669,773 | B2 | 6/2017 | Hanley |
| 9,796,339 | B2 | 10/2017 | Hanley et al. |
| 9,833,072 | B1 | 12/2017 | Knake |
| 10,004,331 | B2 | 6/2018 | Jeffries et al. |
| 10,106,094 | B2 | 10/2018 | Hanley |
| 10,172,452 | B2 | 1/2019 | Hanley et al. |
| 10,189,413 | B2 | 1/2019 | Roldan Gonzalez et al. |
| 10,231,540 | B1 * | 3/2019 | Hong ...................... E05B 65/46 |
| 10,362,870 | B1 * | 7/2019 | Smith .................. A47B 88/407 |
| 10,443,271 | B1 * | 10/2019 | Rose ...................... E05B 65/46 |
| 10,455,937 | B2 | 10/2019 | Jeffries et al. |
| 10,538,945 | B2 * | 1/2020 | Jeffries ................. E05C 19/002 |
| 10,703,292 | B2 | 7/2020 | Hanley |
| 11,357,326 | B1 * | 6/2022 | Hanley .................. E05B 65/46 |
| 11,661,767 | B2 * | 5/2023 | Hanley .................. A47B 88/50 312/332.1 |
| 11,918,114 | B2 * | 3/2024 | Hanley ................ A47B 88/467 |
| 11,919,483 | B2 * | 3/2024 | Hanley .................. A47B 96/07 |
| 2006/0273605 | A1 | 12/2006 | Haspel et al. |
| 2007/0069542 | A1 | 3/2007 | Steiger et al. |
| 2011/0169389 | A1 * | 7/2011 | Jeffries .................. A47B 95/02 292/336.3 |
| 2011/0179839 | A1 | 7/2011 | Jeffries |
| 2014/0354001 | A1 * | 12/2014 | Hanley .................. A47B 57/10 296/24.44 |
| 2018/0014638 | A1 * | 1/2018 | Hanley ................ A47B 46/005 |
| 2018/0073289 | A1 | 3/2018 | Jeffries |
| 2018/0245383 | A1 | 8/2018 | Jeffries |
| 2019/0274424 | A1 | 9/2019 | Hanley et al. |
| 2019/0277075 | A1 | 9/2019 | Jeffries |
| 2019/0335902 | A1 | 11/2019 | Smith |
| 2020/0054133 | A1 | 2/2020 | Jeffries et al. |
| 2021/0212462 | A1 * | 7/2021 | Milligan .............. A47B 88/473 |

* cited by examiner

DRAWER ASSEMBLY

CROSS REFERENCE TO RELATED APPLICATIONS

This application is a continuation of U.S. patent application Ser. No. 17/152,201, filed Jan. 19, 2021, which is expressly incorporated herein by reference, in its entirety.

TECHNICAL FIELD

The present disclosure generally relates to drawer assemblies that are used in conjunction with shelves to store items such as, for example, parcels and/or packages, and more particularly to shelving systems for temporarily storing items, wherein one or more drawer assemblies of each shelving system can be unlatched by applying a pushing motion to a handle.

BACKGROUND

Delivery and/or service vehicles such as, for example, trucks, vans and cars may include an assembly having trays positioned on one or more racks located in an interior of the delivery or service vehicle. Items such as, for example, tools, parcels and/or packages are stored on the trays temporarily while the vehicle is being driven to a selected destination, such as, for example, the home or office of a client, a loading dock, or storefront of recipient. A driver of the vehicle or other personnel may remove the item or items from the tray once he or she arrives at the selected destination by accessing the item or items through one or more doors of the vehicle, such as, for example, rear doors of a van or truck. Some vehicles include trays that slide relative to the rack to facilitate accessing the item or items by the driver of the vehicle or other personnel. That is, once one or more doors of the vehicle are opened, the driver or other personnel may slide the trays relative to the rack such that the item or items are conveniently located outside of the interior of the vehicle.

In vehicles that include trays that slide relative to the rack, some trays may tend to slide at undesired times such as, for example, when the delivery vehicle makes a sharp turn and/or when the vehicle comes to an abrupt stop, which causes the item or items positioned on the tray to move relative to the tray and/or fall off the tray and onto the floor of the vehicle, potentially damaging the item or items. While some rack and tray assemblies used in vehicles include a locking mechanism to prevent the trays from sliding relative to the rack, the locking mechanisms used encompass only a small portion of the tray, thus making accessing the locking mechanism difficult and/or may require two hands to operate. For example, conventional locking mechanisms include a handle having a thumb release on one side of the handle. In order to lock and/or unlock the tray from the rack, the driver of the vehicle or other personnel is required to apply the thumb release, typically by pressing the thumb release down. Due to the small size and remote location of the thumb release, accessing and/or pressing the thumb release is often difficult, especially when the driver or other personnel is carrying other items. This disclosure describes improvements over these prior art technologies.

SUMMARY

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. A drawer release comprises a first end and a second end. The drawer release is rotatably coupled to the drawer. The first end comprises a second locking element. The second portion is rotatable relative to the first portion to move the drawer release from a first orientation in which the second locking element directly engages the first locking element to prevent the drawer from sliding relative to the member to a second orientation in which the second locking element is spaced apart from the first locking element to allow the drawer to slide relative to the member.

In some embodiments, a pushing motion applied to the second portion rotates the second portion relative to the first portion to move the drawer release from the first orientation to the second orientation. In some embodiments, the second portion directly engages a bottom surface of the second end such that the pushing motion causes an upward force to be applied to the bottom surface to pivot the second end relative to the drawer and move the drawer release from the first orientation to the second orientation. In some embodiments, the pushing motion causes an extension of the second portion that engages a bottom surface of the second end to move in a substantially upward direction such that the extension presses upwardly on the bottom surface of the second end to move the drawer release from the first orientation to the second orientation. In some embodiments, the pushing motion causes the second portion to rotate relative to the first portion such that the second portion exerts an upward force on the second end to move the drawer release from the first orientation to the second orientation.

In some embodiments, the second portion is monolithic and a pushing motion applied to the second portion rotates the second portion relative to the first portion to move the drawer release from the first orientation to the second orientation, wherein the second portion directly engages a bottom surface of the second end such that the pushing motion causes an upward force to be applied to the bottom surface to pivot the second end relative to the drawer to move the drawer release from the first orientation to the second orientation.

In some embodiments, the drawer release moves from the first orientation to the second orientation by an operator pushing the second portion. In some embodiments, the second portion directly engages a bottom surface of the second end such that the operator pushing the second portion causes an upward force to be applied to the bottom surface to pivot the second end relative to the drawer and move the drawer release from the first orientation to the second orientation. In some embodiments, the operator pushing the second portion causes an extension of the second portion to move in a substantially upward direction such that the extension presses up on a bottom surface of the second end to move the drawer release from the first orientation to the second orientation. In some embodiments, the operator pushing the second portion causes the second portion to rotate such that the second portion exerts an upward force on the second end to move the drawer release from the first orientation to the second orientation.

In some embodiments, the second portion is monolithic and the drawer release moves from the first orientation to the second orientation by an operator pushing the second portion, wherein the second portion directly engages a bottom surface of the second end such that the operator pushing the second portion causes an upward force to be applied to the bottom surface to pivot the second end relative to the drawer and move the drawer release from the first orientation to the second orientation.

In some embodiments, the second portion directly engages a bottom surface of the second end such that rotating the second portion relative to the first portion causes an upward force to be applied to the bottom surface to pivot the second end relative to the drawer to move the drawer release from the first orientation to the second orientation. In some embodiments, rotation of the second portion relative to the first portion causes the second end to move upwardly to move the drawer release from the first orientation to the second orientation. In some embodiments, the handle has a maximum width that is greater than a maximum width of the frame. In some embodiments, the drawer assembly is free of any springs. In some embodiments, the frame comprises opposite first and second ends, the handle being coupled directly to the first end of the frame, the first locking element comprising a first end surface that faces toward the first end of the frame and an opposite second end surface that faces toward the second end of the frame, the second locking element directly engaging the second end surface when the drawer release is in the first orientation. In some embodiments, the drawer release comprises a plate, a first flange and a second flange, the first flange defining the second locking element, the second portion directly engaging a bottom surface of the second flange such that an upward force applied to the bottom surface by the second portion pivots the drawer release relative to the drawer to move the drawer release from the first orientation to the second orientation, the first and second flanges each extending perpendicular to the plate, the first end extending at an acute angle relative to the second flange. In some embodiments, a shelf comprises the drawer assembly coupled to a frame of the shelf, wherein the member is an outer member and is fixed to the frame of the shelf, the shelf comprising an inner member movably disposed in a channel of outer member, the drawer comprising a rail coupled to the frame, the rail being movably disposed in a channel of the inner member, and wherein the inner member is prevented from sliding relative to the outer member when the drawer release is in the first orientation.

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. The second portion is monolithic. The handle having a maximum width that is greater than a maximum width of the frame. A drawer release comprises a first end and a second end. The second portion directly engaging a bottom surface of the second end. The drawer release is rotatably coupled to the drawer. The first end comprises a second locking element. A pushing motion applied to the second portion rotates the second portion relative to the first portion such that the second portion exerts an upward force on the bottom surface to move the drawer release from a first orientation in which the second locking element directly engages the first locking element to prevent the drawer from translating relative to the member to a second orientation in which the second locking element is spaced apart from the first locking element to allow the drawer to translate relative to the member.

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. A drawer release comprises a first end and a second end. An extension of the second portion directly engages a bottom surface of the second end. The drawer release is rotatably coupled to the drawer. The first end comprises a second locking element. A pushing motion applied to the second portion rotates the second portion relative to the first portion such that the extension moves in an upward direction to exert a force on the bottom surface to move the drawer release from a first orientation in which the second locking element directly engages the first locking element to prevent the drawer from translating relative to the member to a second orientation in which the second locking element is spaced apart from the first locking element to allow the drawer to translate relative to the member.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
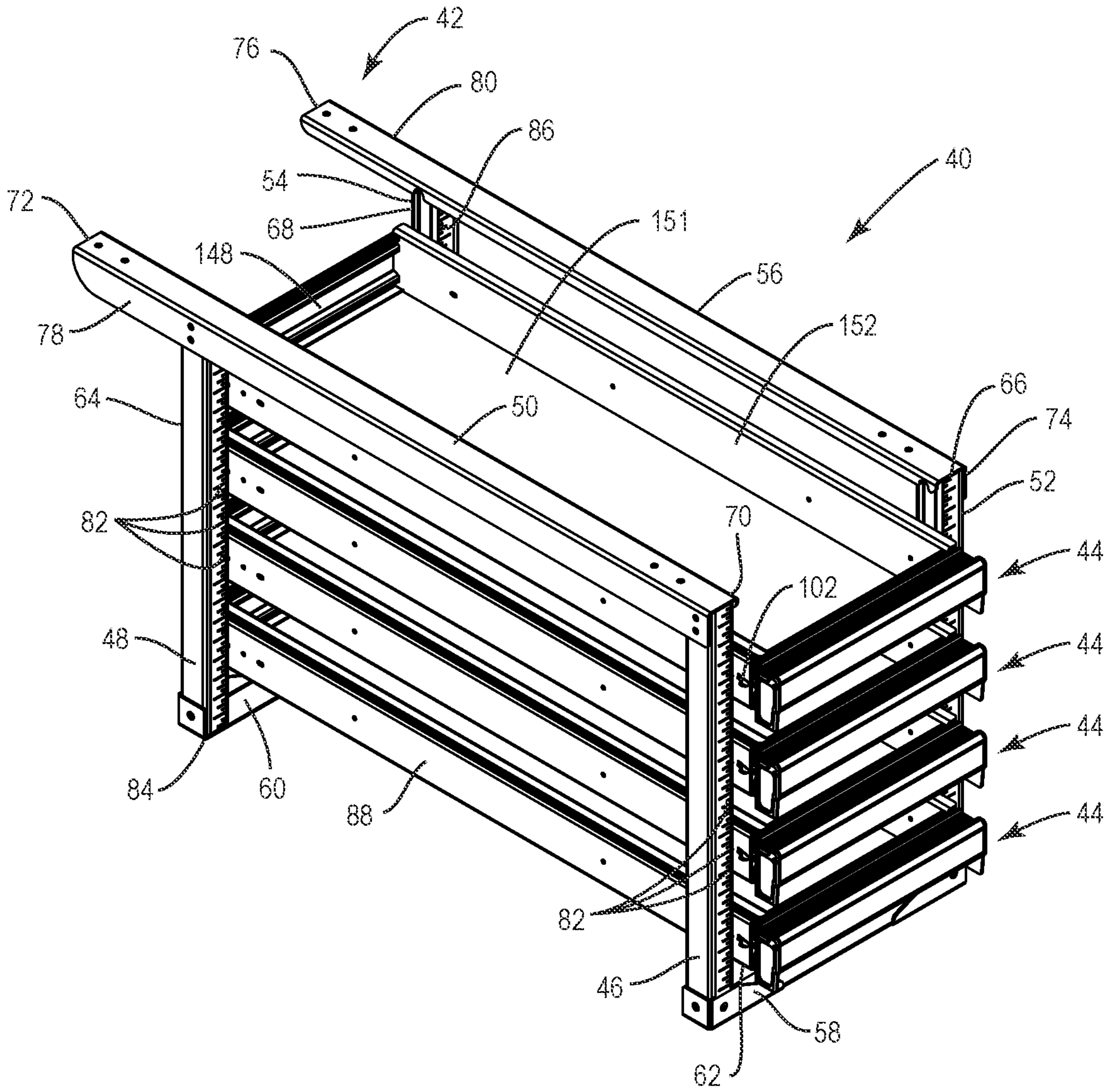
FIG. 1 is a perspective view of one embodiment of a shelving system in accordance with the principles of the present disclosure, with drawer assemblies of the shelving system in a latched or closed orientation.

The exemplary embodiments of a shelving system and related methods of use are discussed in terms of devices for the storage of items. As discussed in greater detail hereinbelow, the shelving systems of the present disclosure include many improvements over conventional shelving systems. For example, while some conventional shelving systems include a spring loaded mechanism with a pin or engaging member that contacts a slide release, the shelving systems of the present disclosure, in contrast, do not include any springs or other assist devices and alternatively utilize a release lever that acts directly on a slide release tab. It is envisioned that by not including any springs or other assist devices, the shelving systems of the present disclosure are more robust than conventional shelving systems that include springs or other assist devices, since the mechanism receives the benefit of making use of the spring returns present in the drawer slides.

Some conventional shelving systems include a self-contained spring mechanism with a nylon follower and plastic end cap that constrains the spring mechanism. The shelving systems of the present disclosure, in contrast, rely on the spring returns already built into the drawer slides. In other conventional systems there exists an additional spring turn system and associated components that while enabling a spring assist feature on an uninstalled release device add unnecessary complexity to the complete system. End caps act only as a closeout. That is, the end caps of the shelving systems of the present disclosure serve only as a closeout and for bump protection, and breakage will not affect the operation of the mechanism, whereas in other conventional systems a thin plastic housing encases a self-contained spring mechanism that can be exposed upon breakage.

Some conventional shelving systems include a mechanism guide pin that engages drawer slide lock tabs in a downward motion. The shelving systems of the present disclosure, in contrast, include a handle having a portion that directly activates on a release lever in an upward motion when an operator applies a pushing motion to the handle, as discussed herein. The pushing motion required to disengage the drawer slides is a more ergonomic motion that induces less strain on the system, whereas other conventional systems rely on the mechanism release lever to act as a pulling device, and thus introducing additional strain to the system.

Some conventional shelving systems include a release lever that rotates outwardly and is used as a pull handle to open the drawer. The shelving systems of the present disclosure, in contrast, include a release lever that pivots upward as a handle is pushed inwardly in order to open and close the drawer. The pushing motion is in opposition to the intended direction of the drawers, and acts only to disengage the drawer slides, whereas the pulling motion in other conventional systems can stress the drawer slide release tabs since the entirety of the pulling force required to open the drawers is bearing on these release tabs.

Some conventional shelving systems require a pulling motion to disengage drawer slides. The shelving systems of the present disclosure, in contrast, require a pushing motion to disengage drawer slides. While pulling a handle requires an operator to rely solely upon his or her finger and/or arm muscles to move (pull) the handle, a pushing motion, in contrast, can be applied by the operator using his or her body weight in conjunction with his or her finger and/or arm muscles, thus making it easier for the operator to disengage drawer slides. That is the operator need not rely solely upon his or her finger and/or arm muscles to move the handle, but can also use his or her body weight to move the handle. This is especially important in systems in which a significant amount of force is required to disengage drawer slides.

Excessive opening force creates the potential for the mechanism in some conventional shelving systems to deform slide release lock tabs and may lead to premature system failure. The shelving systems of the present disclosure, in contrast, constrain excessive opening force by the mechanism housing, where slide release tabs will bottom out and limit any damaging deformation, as discussed herein. [

When in the situation of premature drawer slide failure, the lock tabs of some conventional shelving systems are free to droop, which causes the entire mechanism to fail in the unlocked position (with undesirable unintended motion of the drawers). Lock tabs of the shelving systems of the present disclosure, in contrast, are constrained by a release lever when in the situation of premature drawer slide failure such that the entire mechanism fails in the locked position (so the drawer will remain locked in the closed position until it can be serviced).

Some conventional shelving systems include thin plastic end caps that are prone to breakage, resulting in a mechanism failure. The shelving systems of the present disclosure, in contrast, include thicker plastic end caps that serve as bump protection, and breakage will not affect the operation of the mechanism.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a shelving system, related components and methods of employing the shelving system in accordance with the principles of the present disclosure. Alternate embodiments are also disclosed. Reference will now be made in detail to the exemplary embodiments of the present disclosure, which are illustrated in the accompanying figures. Turning to FIGS. 1-46, there are illustrated components of a shelving system 40.

In some embodiments, system 40 is configured for mounting in a vehicle, such as, for example, a delivery or service vehicle, such as, for example, a van or truck. In some embodiments, system 40 is mounted in the vehicle such that system 40 is accessible through rear doors of the vehicle, but is not readily accessible through side doors, or any other doors of the vehicle. In such embodiments, system 40 is positioned such that system 40 may move from a closed position to an open position when the rear doors of the vehicle open, but is prevented from moving from the closed position to the open position when the rear doors are closed, as will be described. In some embodiments, system 40 is mounted in the vehicle such that system 40 is accessible through one or more side door of the vehicle, but is not readily accessible through rear doors, or any other doors of the vehicle. In such embodiments, system 40 is positioned such that system 40 may move from the closed position to the open position when the side door of the vehicle is open, but is prevented from moving from the closed position to the open position when the side door is closed, as will be described. In some embodiments, system 40 includes a plurality of shelving units, wherein one unit is mounted in the vehicle such that it is accessible through one or more side doors on a first side of the vehicle and another unit is mounted in the vehicle such that it is accessible through one or more side doors on an opposite second side of the vehicle. In some embodiments, system 40 includes the vehicle.

The components of shelving system 40 can be fabricated from materials including metals, polymers and/or composites, depending on the particular application. For example, the components of system 40, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 40 may have material composites, including the above materials, to achieve various desired characteristics such as strength, rigidity, elasticity, performance and durability. The components of system 40, individually or collectively, may also be fabricated from a heterogeneous material such as a combination of two or more of the above-described materials. The components of system 40 can be extruded, molded, injection molded, cast, pressed and/or machined. The components of system 40 may be monolithically formed, integrally connected or include fastening elements and/or instruments, as described herein.

System 40 includes a shelf frame 42 and one or more drawer assemblies 44 that are each coupled to frame 42. Frame 42 includes a vertical member 46 that is connected to a vertical member 48 by a horizontal member 50 and a vertical member 52 that is connected to a vertical member 54 by a horizontal member 56. A cross member 58 connects member 46 to member 52 and a cross member 60 connects member 48 to member 54.

Frame 42 has a length L1 from an outer surface 62 of member 46 to an opposite outer surface 64 of member 48 and from an outer surface 66 of member 52 to an opposite outer surface 68 of member 54. Members 50, 56 each have a length L2 from an end surface 70 of member 50 to an opposite end surface 72 of member 50 and from an end surface 74 of member 56 to an opposite end surface 76 of member 56. Length L2 is greater than length L1 such that end surface 70 is flush or substantially flush with outer surface 62, end surface 74 is flush or substantially flush with outer surface 66, an end 78 of member 50 extends outwardly from outer surface 64 and an end 80 of member 56 extends outwardly from outer surface 68. That is, ends 78, 80 form an overhang that extends outwardly from members 48, 54. The overhang is configured for allowing a deeper drawer depth than the vertical guide members would otherwise provide for the system. In some embodiments, length L2 is equal or substantially equal to length L1 such that end surface 70 is flush or substantially flush with outer surface 62, end surface 72 is flush or substantially flush with outer surface 64, end surface 74 is flush or substantially flush with outer surface 66 and end surface 76 is flush or substantially flush with outer surface 68.

In some embodiments, frame 42 includes markings, such as, for example, indicia 82 on one or more components of frame 42. In some embodiments, indicia is configured to illustrate one or more distances along a height of frame 42. For example, in some embodiments, frame 42 includes indicia 82 along all or a portion of outer surface 62, along all or a portion of outer surface 66, along all or a portion of an inner surface 84 of member 48 and/or along all or a portion of an inner surface 86 of member 54. In some embodiments, indicia 82 includes graduated markings and is identical on outer surface 62, outer surface 66, inner surface 84 and/or inner surface 86. In some embodiments, indicia 82 includes one or more markings, letters, words and/or numbers correlating to a distance along member 46 or member 52 from member 58 and/or a distance along member 48 or member 54 from member 60. In some embodiments, indicia 82 correlates to units of measurement, such as, for example, millimeters, centimeters, inches, feet, etc. In some embodiments, indicia 82 are consecutively numbers, beginning at ends of members 46, 52 that engage member 58 and at ends of members 48, 54 that engage member 60. Inner surface 84 is opposite outer surface 64 and inner surface 86 is opposite outer surface 68.

Drawer assemblies 44 each include a cross member, such as, for example, an outer member 88 and a cross member, such as, for example, an outer member 90. Member 88 comprises an outer surface 92 and an inner surface 94 opposite outer surface 92 and member 90 comprises an outer surface 96 and an inner surface 98 opposite outer surface 96. Member 88 is coupled to frame 42 such that outer surface 92 directly engages members 46, 48 and member 88 extends perpendicular to members 46, 48. Member 90 is coupled to frame 42 such that outer surface 96 directly engages members 52, 54 and member 90 extends perpendicular to members 52, 54. It is envisioned that members 88, 90 may each be coupled to frame 42 via screws, bolts, rivets, welding, etc.

In some embodiments, member 88 is permanently coupled to members 46, 48 such that member 88 cannot be moved relative to members 46, 48 without breaking at least one of members 46, 48, 88 and member 90 is permanently coupled to members 52, 54 such that member 90 cannot be moved relative to members 52, 54 without breaking at least one of members 52, 54, 90.

In some embodiments, member 88 is removably coupled to members 46, 48 such that member 88 can be moved relative to members 46, 48 without breaking at least one of members 46, 48, 88 and member 90 is removably coupled to members 52, 54 such that member 90 can be moved relative to members 52, 54 without breaking at least one of members 52, 54, 90. This allows member 88 to be selectively positioned along lengths of members 46, 48 and member 90 to be selectively positioned along lengths of members 52, 54, wherein members 88, 90 are each provisionally fixed to frame 42 after being selectively positioned along lengths of members 52, 54.

In some embodiments, indicia 82 on members 46, 48, 52, 54 is used to ensure that member 88 extends perpendicular to members 46, 48, member 90 extends perpendicular to members 52, 54 and that member 88 is positioned at the same distance along heights of members 46, 48 as member 90 is positioned at along heights of members 52, 54. That is, indicia 82 may be used to ensure that member 88 extends perpendicular to members 46, 48, member 90 extends perpendicular to members 52, 54, member 88 is positioned at a first distance from members 58, 60 along heights of members 46, 48 and member 90 is also positioned at the first distance from members 58, 60 along heights of members 52, 54.

Figure 18:
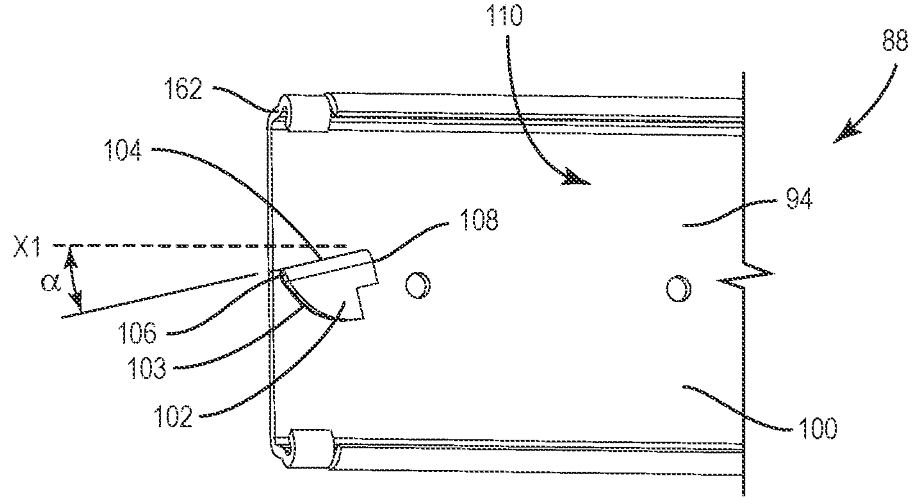
FIG. 18 is a close up, perspective view of a portion of the component shown in FIG. 16.
Figure 19:
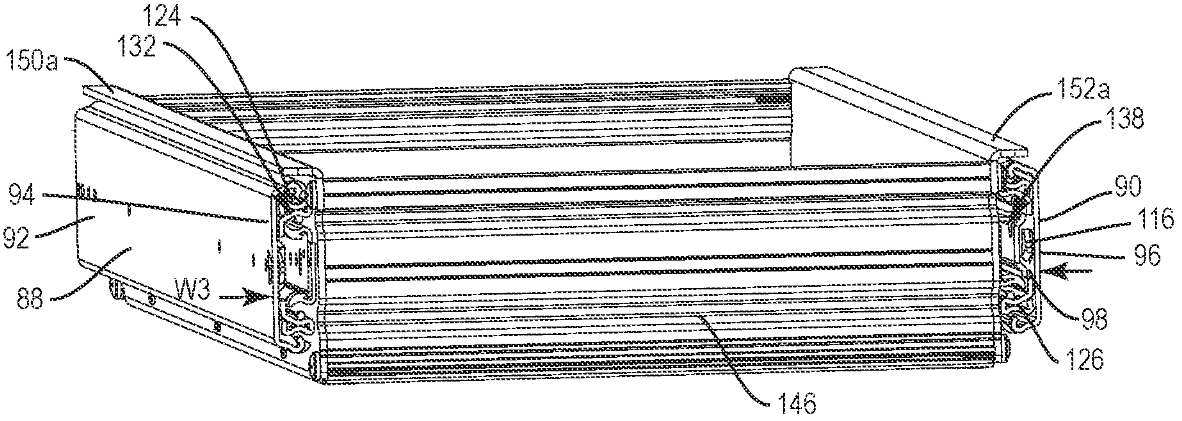
FIG. 19 is a perspective view of the component shown in FIG. 16 coupled to the components shown in FIG. 9 and the component shown in FIG. 13.

Member 88 comprises a wall 100 that includes surfaces 92, 94. Wall 100 defines a slide release tab or a locking element, such as, for example, a flange 102 extending inwardly from inner surface 94. Flange 102 includes a top portion 104 that extends continuously from an end surface 106 to an opposite end surface 108, as shown in FIG. 18, for example. Portion 104 extends directly from surface 94 such that there is no space or gap between surface 94 and portion 104. Portion 104 is linear and/or planar from end surface 106 to end surface 108. In some embodiments, portion 104 extends at an angle $\alpha$ relative to a longitudinal axis X1 defined by the length of member 88. Inner surface 94 defines a channel 110 that extends along axis X1. In some embodiments, angle $\alpha$ is an acute angle. In some embodiments, angle $\alpha$ is an angle between about 1 degree and about 45 degrees. In some embodiments, angle $\alpha$ is an angle between about 1 degree and about 35 degrees. In some embodiments, angle $\alpha$ is an angle between about 1 degree and about 25 degrees. In some embodiments, angle $\alpha$ is an angle between about 1 degree and about 15 degrees. In some embodiments, angle $\alpha$ is an angle between about 1 degree and about 5 degrees.

Member 90 comprises a wall 112 that includes surfaces 96, 98. Wall 112 defines a slide release tab or a locking element, such as, for example, a flange 114 extending inwardly from inner surface 98, as shown in FIGS. 34, 36, 38, 42 and 44, for example. Flange 114 includes a top portion 116 that extends continuously from an end surface 118 to an opposite end surface 120. Portion 116 extends directly from surface 98 such that there is no space or gap between surface 98 and portion 116. Portion 116 is curved and/or arcuate from end surface 118 to end surface 120. The length of member 90 defines a longitudinal axis X2. Inner surface 98 defines a channel 122 that extends along axis X2.

Figure 35:
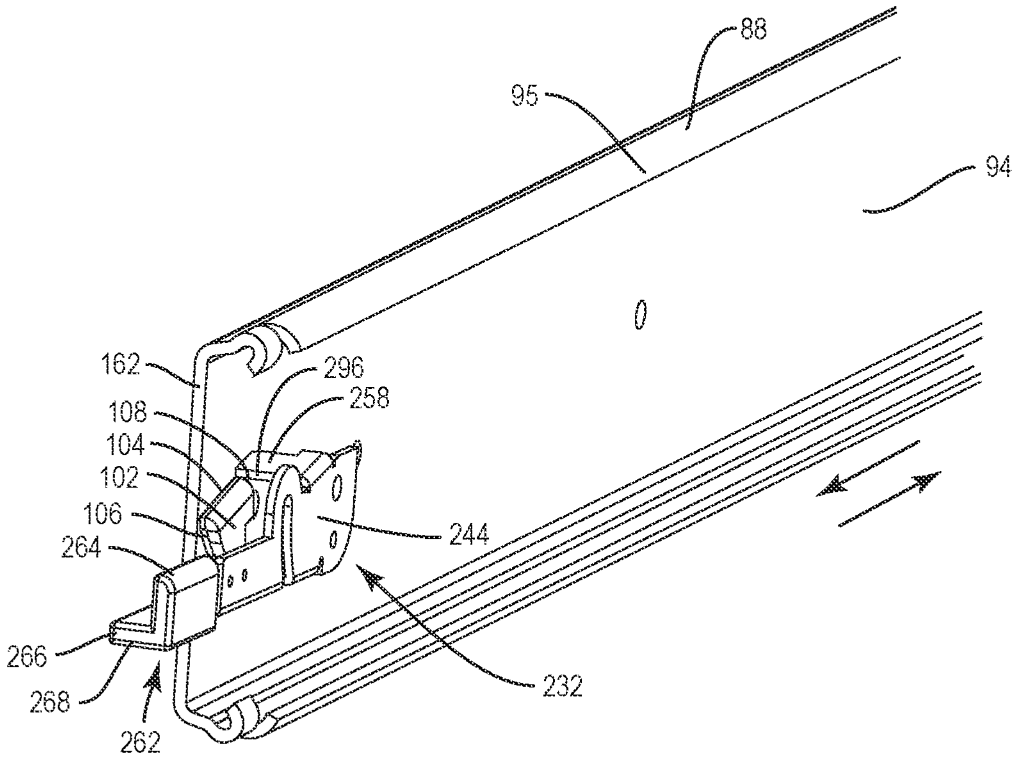
FIG. 35 is a perspective view showing the orientation of components of the drawer assembly shown in FIG. 3 when the drawer assembly in the latched or closed orientation.

In some embodiments, member 88 is structurally identical to member 90. That is, the difference between member 88 of drawer assembly 44 and member 90 of the same drawer assembly 44 is the manner in which it is mounted to frame 42. For example, flange 102 is identical to flange 114. However, when member 88 is mounted to frame 42, a linear portion of flange 102 (portion 104) faces toward a top of member 88 and a curved portion 103 of flange 102 faces toward a bottom of member 88, as shown in FIG. 18, and when member 90 is mounted to frame 42, a curved portion of flange 114 (portion 116) faces toward a top of member 90 and a linear portion 115 of flange 114 faces toward a bottom of member 90, as shown in FIG. 35.

Figure 13:
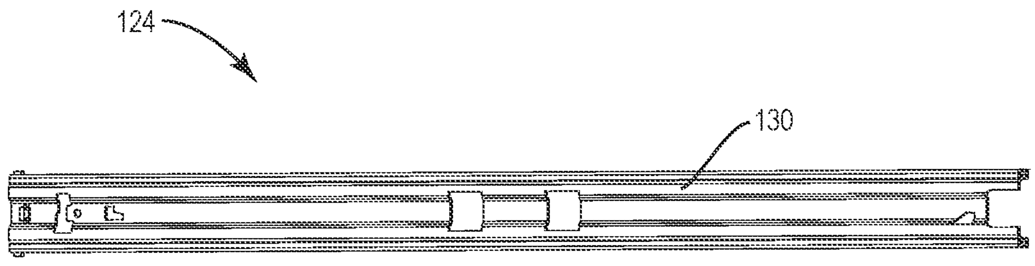
FIG. 13 is a perspective view of a component of the drawer assembly shown in FIG. 3.
Figure 14:
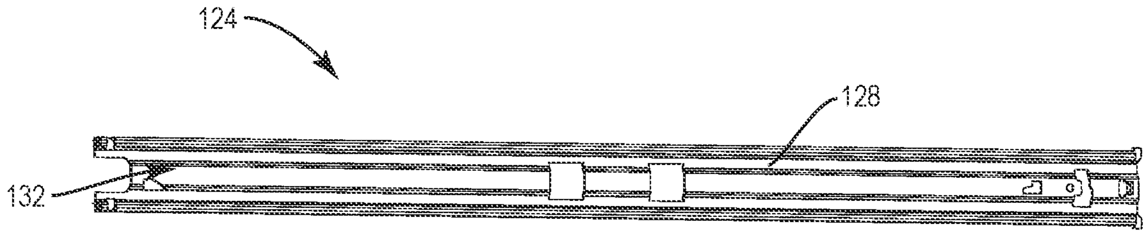
FIG. 14 is a perspective view of the component shown in FIG. 13.
Figure 15:
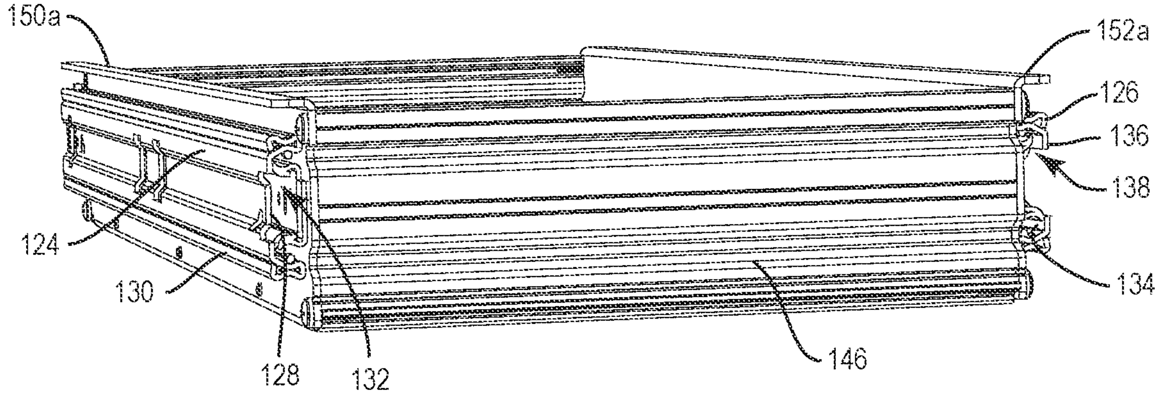
FIG. 15 is a perspective view of the component shown in FIG. 13 coupled to the components shown in FIG. 9.
Figure 16:
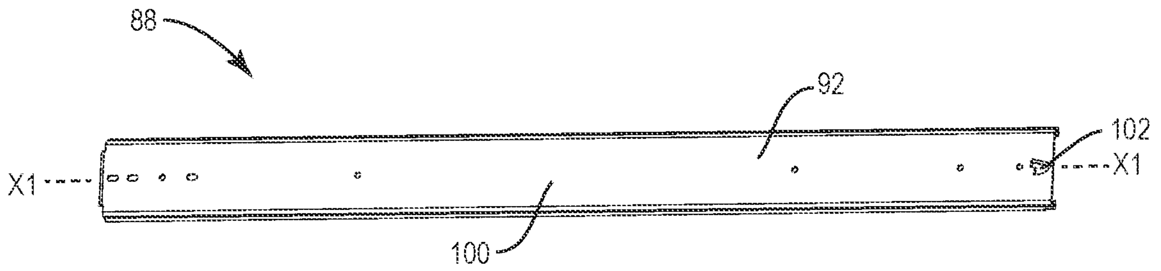
FIG. 16 is a perspective view of a component of the drawer assembly shown in FIG. 3.
Figure 17:
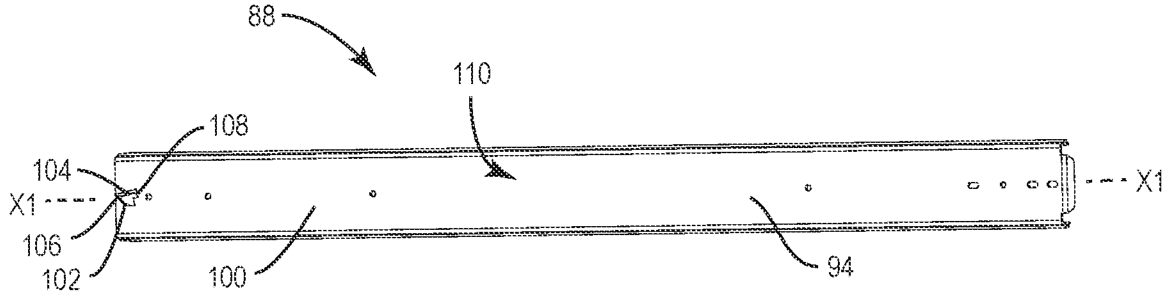
FIG. 17 is a perspective view of the component shown in FIG. 16.

Drawer assemblies 44 each include a cross member, such as, for example, an inner member 124 and a cross member, such as, for example, an inner member 126, as shown in FIGS. 13-15, for example. Member 124 is configured to be slidingly positioned in channel 110 such that member 124 is parallel and/or coaxial with axis X1 and member 126 is configured to be slidingly positioned in channel 122 such that member 126 is parallel and/or coaxial with axis X2. Member 124 includes an inner surface 128 and an opposite outer surface 130. Surface 128 defines a channel 132. Member 124 is positioned in channel 110 such that surface 130 faces surface 94 of member 88. Member 126 includes an inner surface 134 and an opposite outer surface 136. Surface 134 defines a channel 138. Member 126 is positioned in channel 122 such that surface 136 faces surface 98 of member 90.

Figure 9:
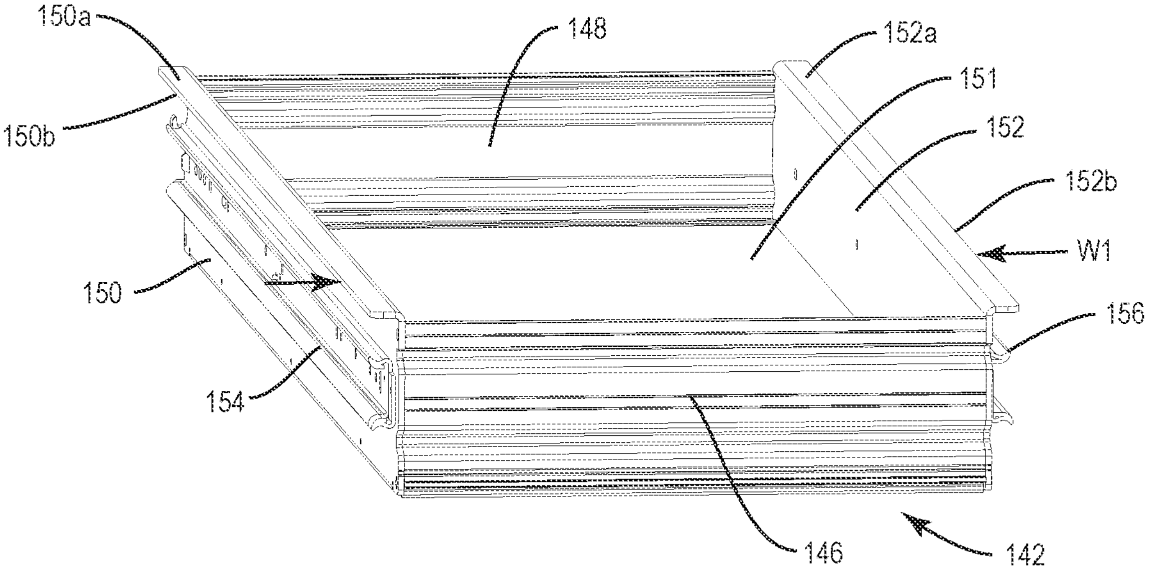
FIG. 9 is a perspective view of components of the drawer assembly shown in FIG. 3.
Figure 10:
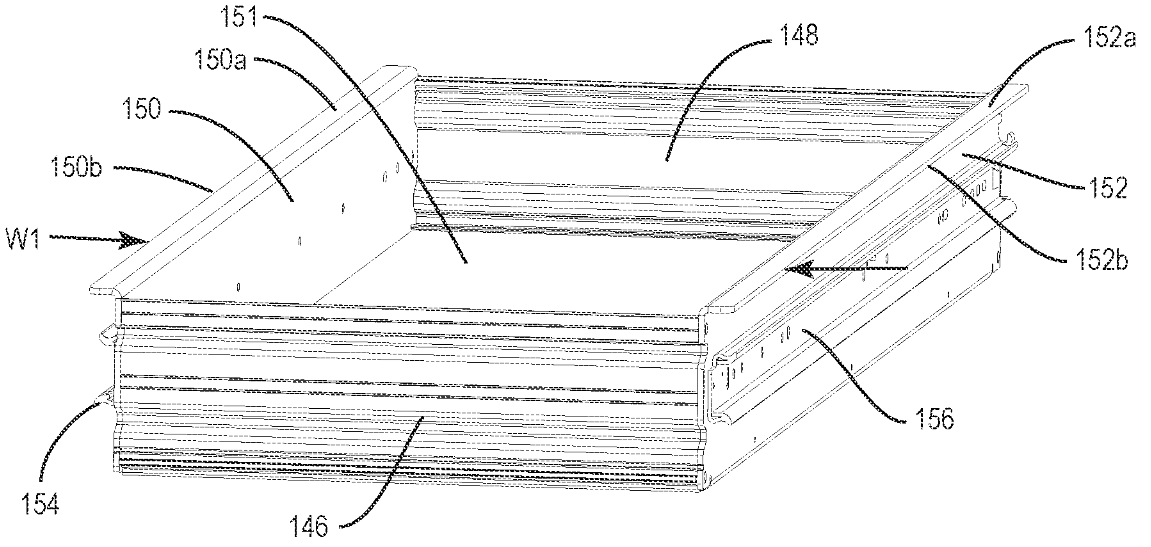
FIG. 10 is a perspective view of the components shown in FIG. 9.

Drawer assemblies 44 each include a drawer 140 having a drawer frame 142 and a handle 144 coupled to frame 142. Frame 142 includes an end wall 146 and an opposite end wall 148, as shown in FIGS. 9-10, for example. A side wall 150 extends from end wall 146 to end wall 148 and an opposite side wall 152 extends from end wall 146 to end wall 148 such that side wall 152 is spaced apart from side wall 150 by end walls 146, 148. Wall 150 includes a flange 150*a* having an end surface 150*b* and wall 152 includes a flange 152*a* having an end surface 152*b*, as shown in FIGS. 9 and 10 for example. Frame 142 has a (maximum) width W1 defined by the distance from end surface 150*b* to end surface 152*b*. Drawer 140 includes a tray 151 extending from wall 146 to wall 148 and from wall 150 to wall 152. In some embodiments, tray 151 joins bottom ends of walls 146, 148, 150, 152. Tray 151 is configured to support items within drawer 140. That is, one or more items can be stored within drawer 140 such that the item(s) is/are positioned on top of tray 151 and are positioned between walls 146, 148 and/or walls 150, 152.

Figure 11:
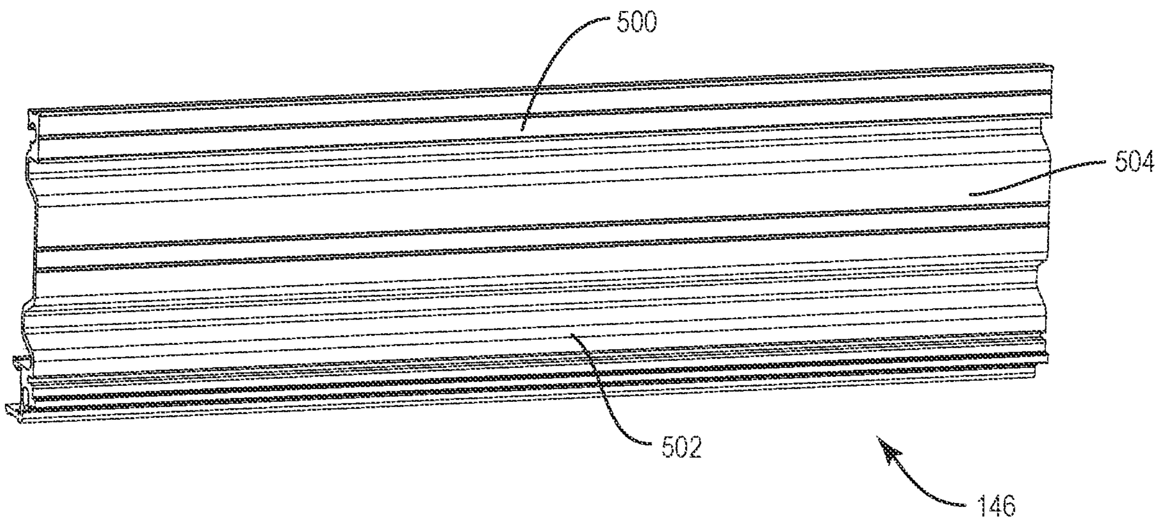
FIG. 11 is a front view of a portion of one of the components shown in FIG. 9.
Figure 12:
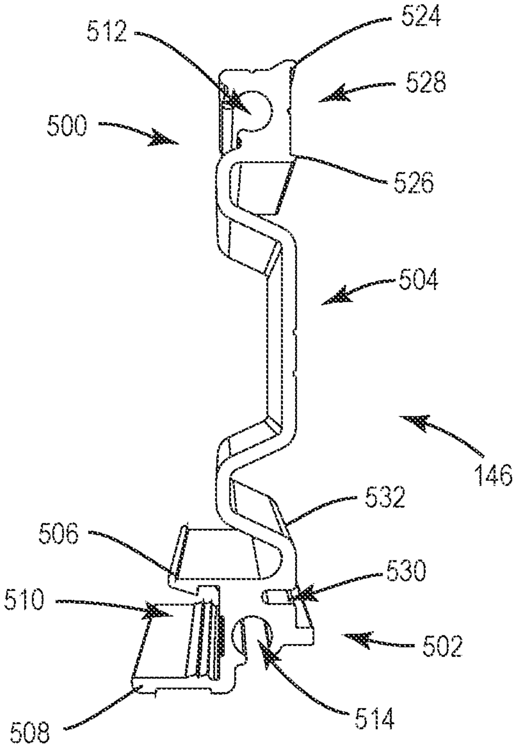
FIG. 12 is a perspective view of the portion shown in FIG. 11.
Figure 12A:
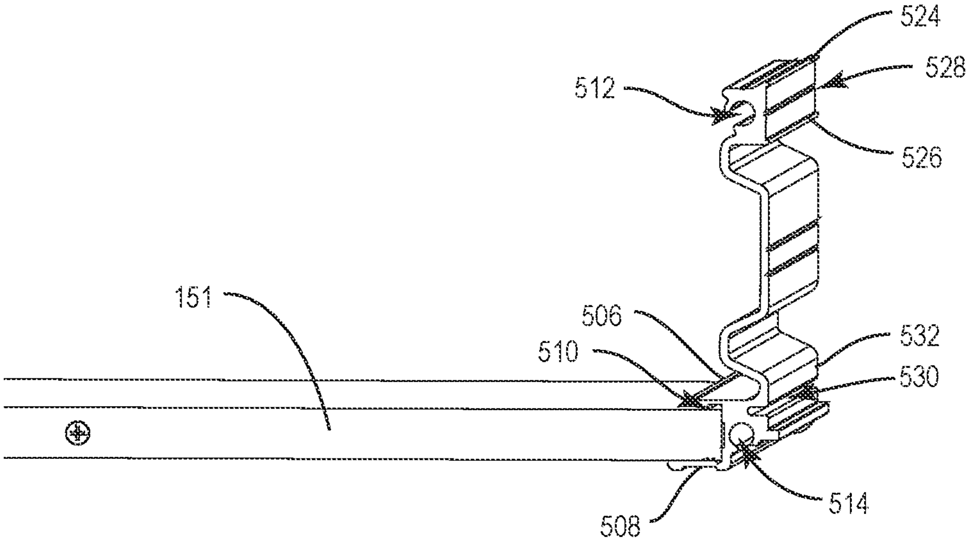
FIG. 12A is a perspective view of components of the drawer assembly shown in FIG. 3.
Figure 12B:
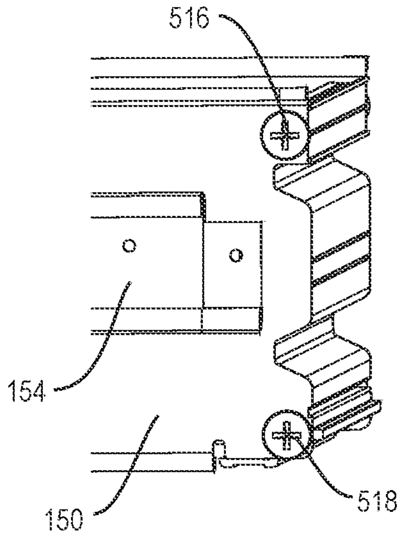
FIG. 12B is a perspective view of components of the drawer assembly shown in FIG. 3.
Figure 12C:
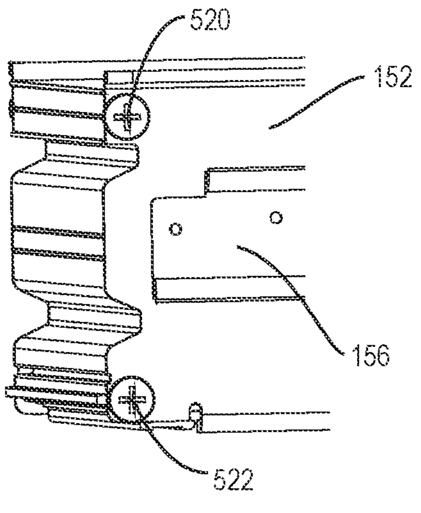
FIG. 12C is a perspective view of components of the drawer assembly shown in FIG. 3.

Wall 146 includes features to couple walls 150, 152 to wall 146 and to couple handle 144 to wall 146. For example, in some embodiments, wall 146 includes a top portion 500, a bottom portion 502 and an intermediate portion 504 between top portion 500 and bottom portion 502, as shown in FIGS. 11 and 12, for example. Bottom portion 502 includes spaced apart extensions 506, 508 that define a cavity 510 therebetween. Cavity 510 is configured for disposal of an end of tray 151 such that the entire thickness of tray 151 is positioned between extensions 506, 508, as shown in FIG. 12A. Top portion 500 includes a channel 512 and bottom portion 502 includes a channel 514 that extends parallel to channel 512. A fastener, such as, for example, a screw 516 extends through wall 150 and into an end of channel 512 and a fastener, such as, for example, a screw 518 extends through wall 150 and into an end of channel 514 to couple wall 150 to wall 146, as shown in FIG. 12B. Likewise, a fastener, such as, for example, a screw 520 extends through wall 152 and into an end of channel 152 and a fastener, such as, for example, a screw 522 extends through wall 152 and into an end of channel 154 to couple wall 152 to wall 146, as shown in FIG. 12C. Top portion 500 includes spaced apart flanges 524, 526 that define a recess 528 therebetween. Bottom portion 502 includes a slot 530 extending into a surface 532 of wall 146. Recess 528 and slot 530 are each configured for disposal of a portion of handle 144 to couple handle 144 to wall 146, as discussed herein. In some embodiments, wall 146 is structurally similar to or structurally identical to wall 148 and an end of tray 151 is positioned in a cavity of 148 that is the same or similar to cavity 510 such that the thickness of tray is positioned in the cavity of wall 148.

Drawer 140 further includes rails 154, 156 that are coupled to frame 142. Rail 154 is coupled directly to side wall 150 and rail 156 is coupled directly to side wall 152. Rail 154 is configured to be slidably disposed in channel 132 of member 124 and rail 156 is configured to be slidably disposed in channel 138 of member 126. Drawer 140 is configured to temporarily store one or more items until the one or more items is/are retrieved. In some embodiments, items that are stored in or on drawer 140 (tray 151) are visible when drawer assembly 44 is in the latched or closed orientation. For example, the items are visible between members 46, 48 and/or between members 52, 54 and between adjacent drawers 140, as can be seen from FIGS. 1 and 2, for example. That is, there is no panel or other structure that extends from member 46 to member 48 and/or from member 50 to bottoms of members 46, 48 or panel other structure that extends from member 52 to member 54 and/or from member 56 to bottoms of members 52, 54 so as to block the visibility of items that are stored in or on drawer 140 when drawer assembly 44 is in the latched or closed orientation.

Figure 20:
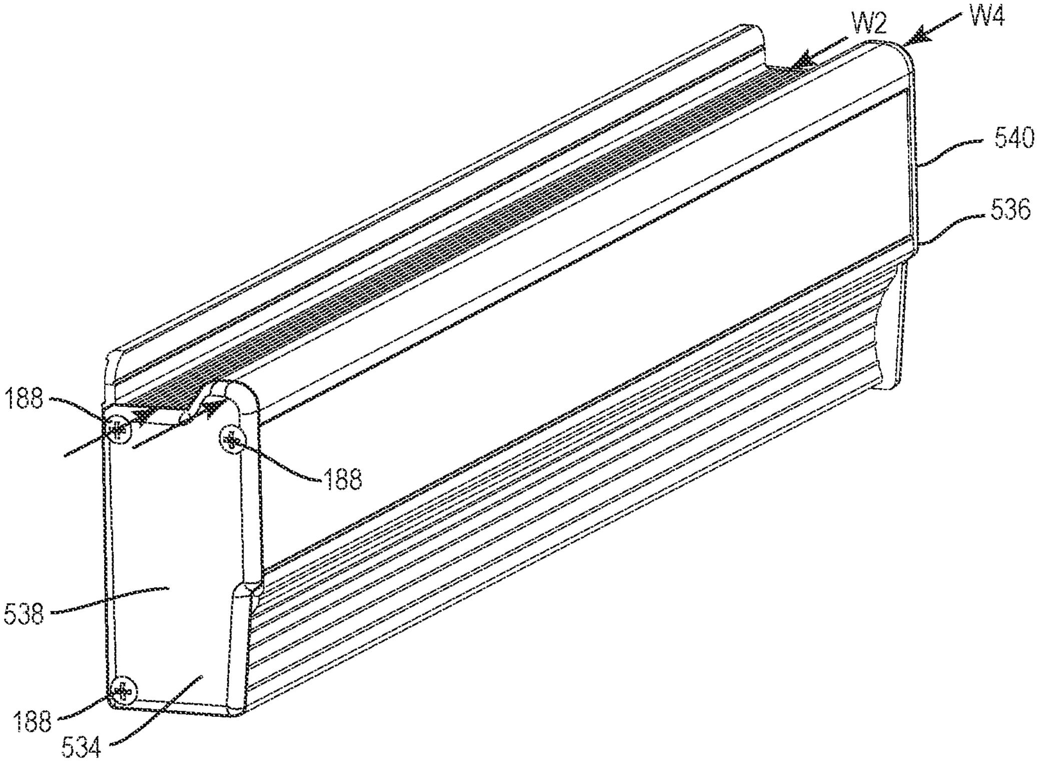
FIG. 20 is a perspective view, in part phantom, of components of the drawer assembly shown in FIG. 3.
Figure 21:
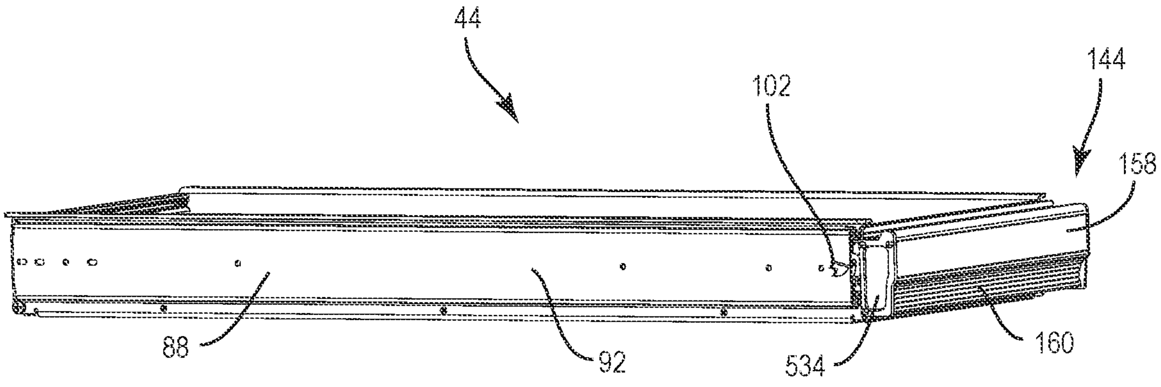
FIG. 21 is a perspective view of the drawer assembly shown in FIG. 3, with the drawer assembly in the latched or closed orientation.
Figure 22:
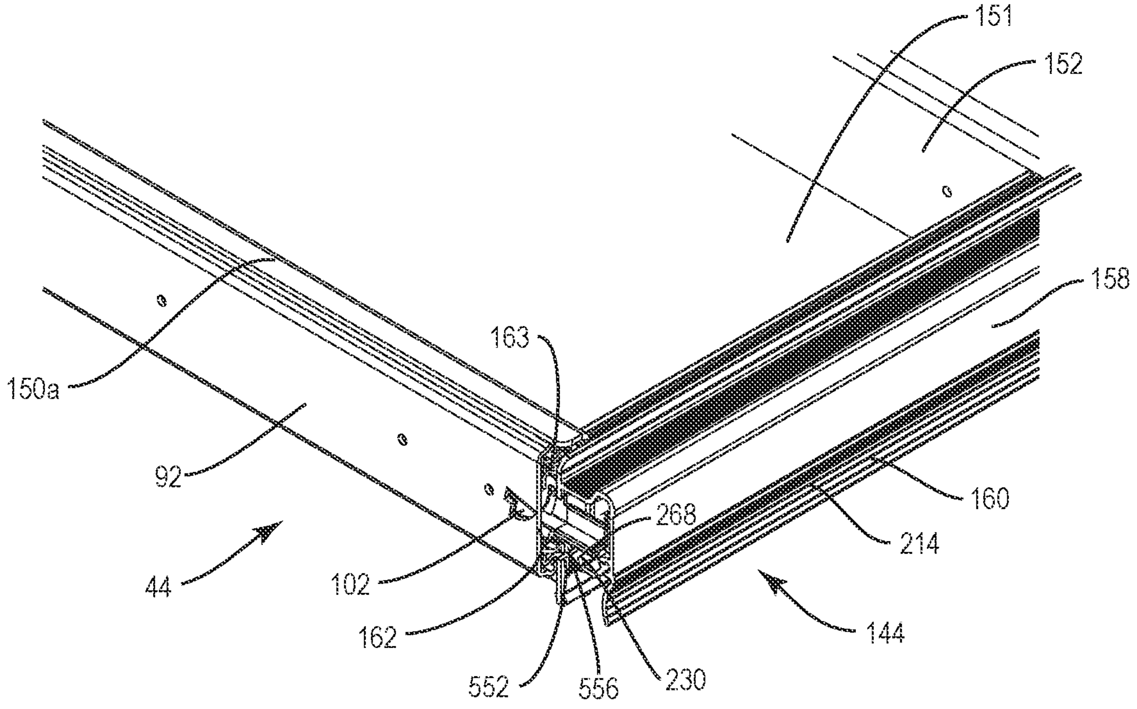
FIG. 22 is a perspective view of a portion of the drawer assembly shown in FIG. 3, with the drawer assembly in the latched or closed orientation and one or more parts removed.

Handle 144 includes a portion 158 that is fixed to frame 142 and a portion 160 that is rotatably coupled to portion 158, as shown in FIGS. 21 and 22, for example. Portions 158, 160 each have a (maximum) width W2, wherein width W2 is greater than width W1. System 40 has a (maximum) width W3 defined by the distance from outer surface 92 of member 88 to outer surface 96 of member 90 when members 88, 90 are coupled to frame 42 as discussed herein. Width W3 is greater than width W1 and is equal to or substantially equal to width W2. In some embodiments, handle 144 includes first and second end caps 534, 536 that are coupled to opposite ends of portion 158. Handle 144 has (maximum) width W4 defined by the distance from an outer surface 538 of end cap 534 to an end surface 540 of end cap 536, wherein outer surface 540 faces away from outer surface 538, as shown in FIG. 20, for example. Width W4 is greater than width W3.

Figure 4:
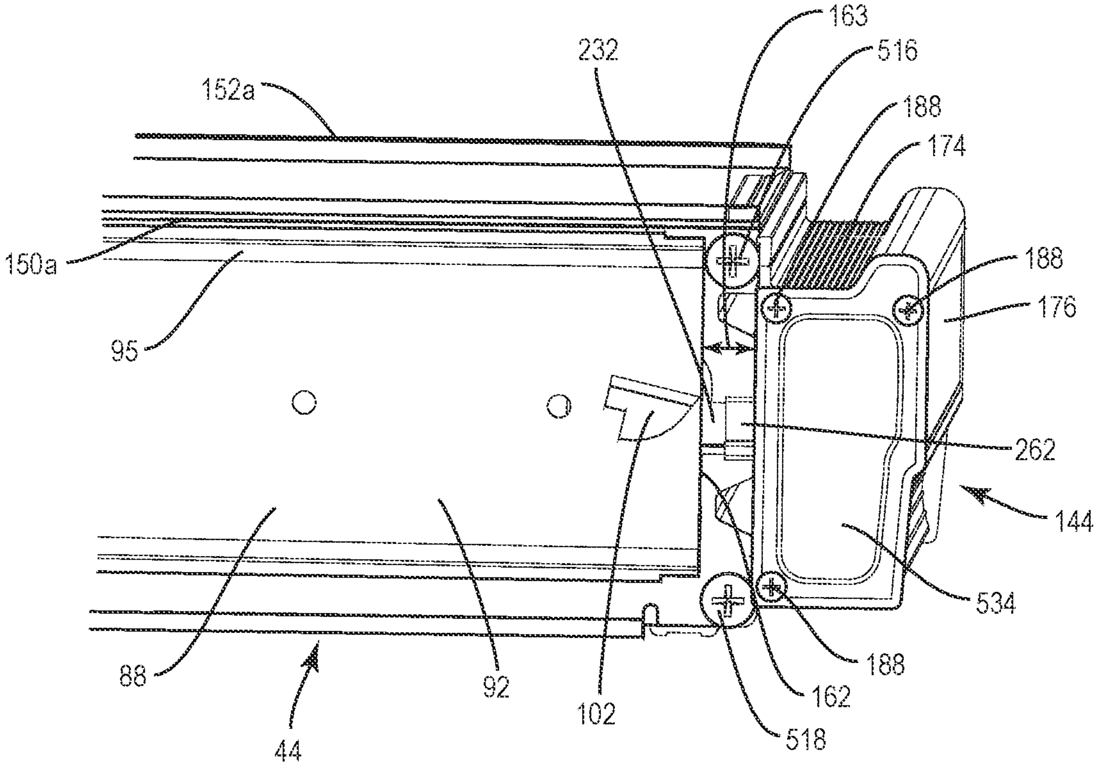
FIG. 4 is a perspective view of a portion of the drawer assembly shown in FIG. 3.
Figure 5:
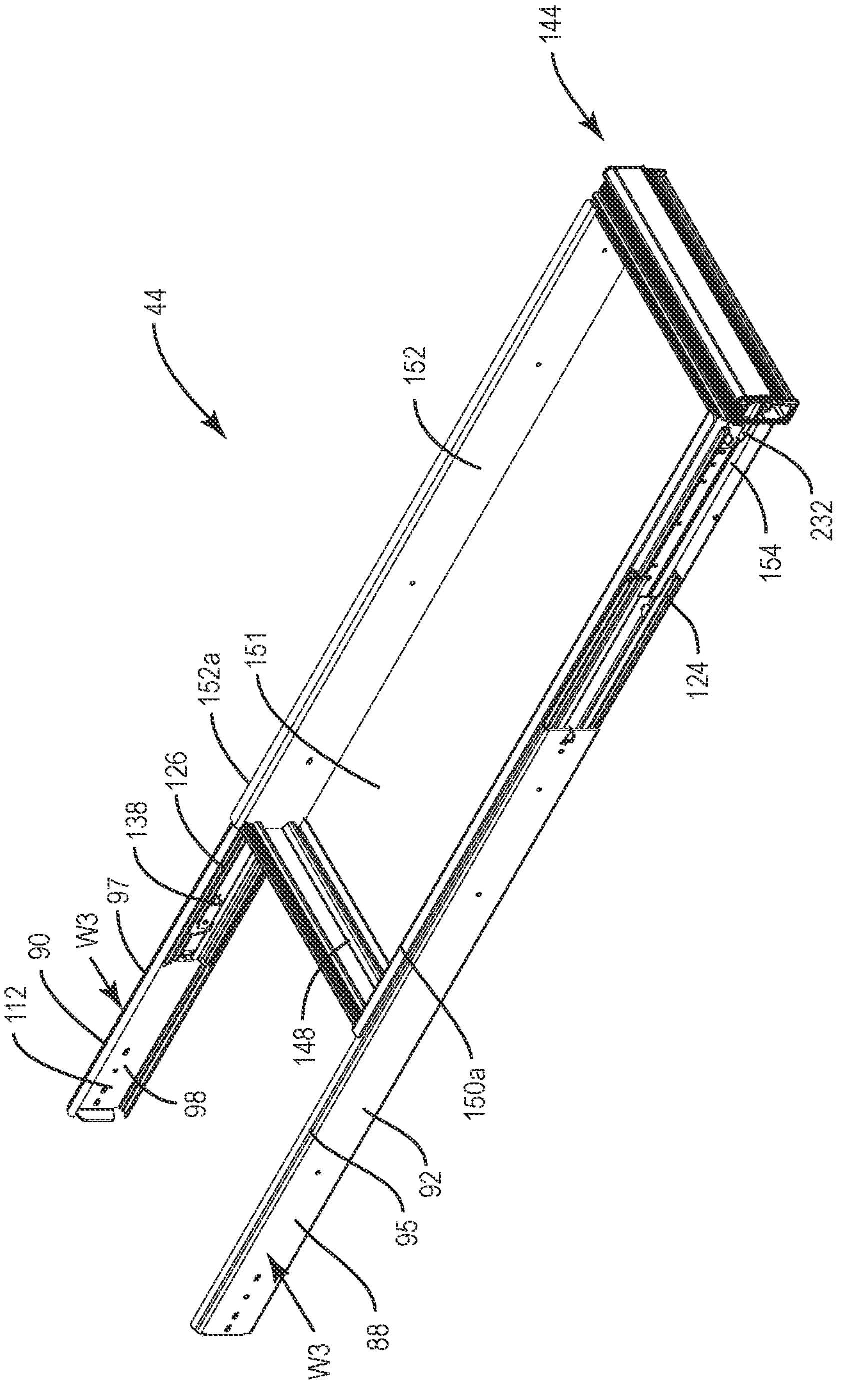
FIG. 5 is a perspective view of the drawer assembly shown in FIG. 3.
Figure 6:
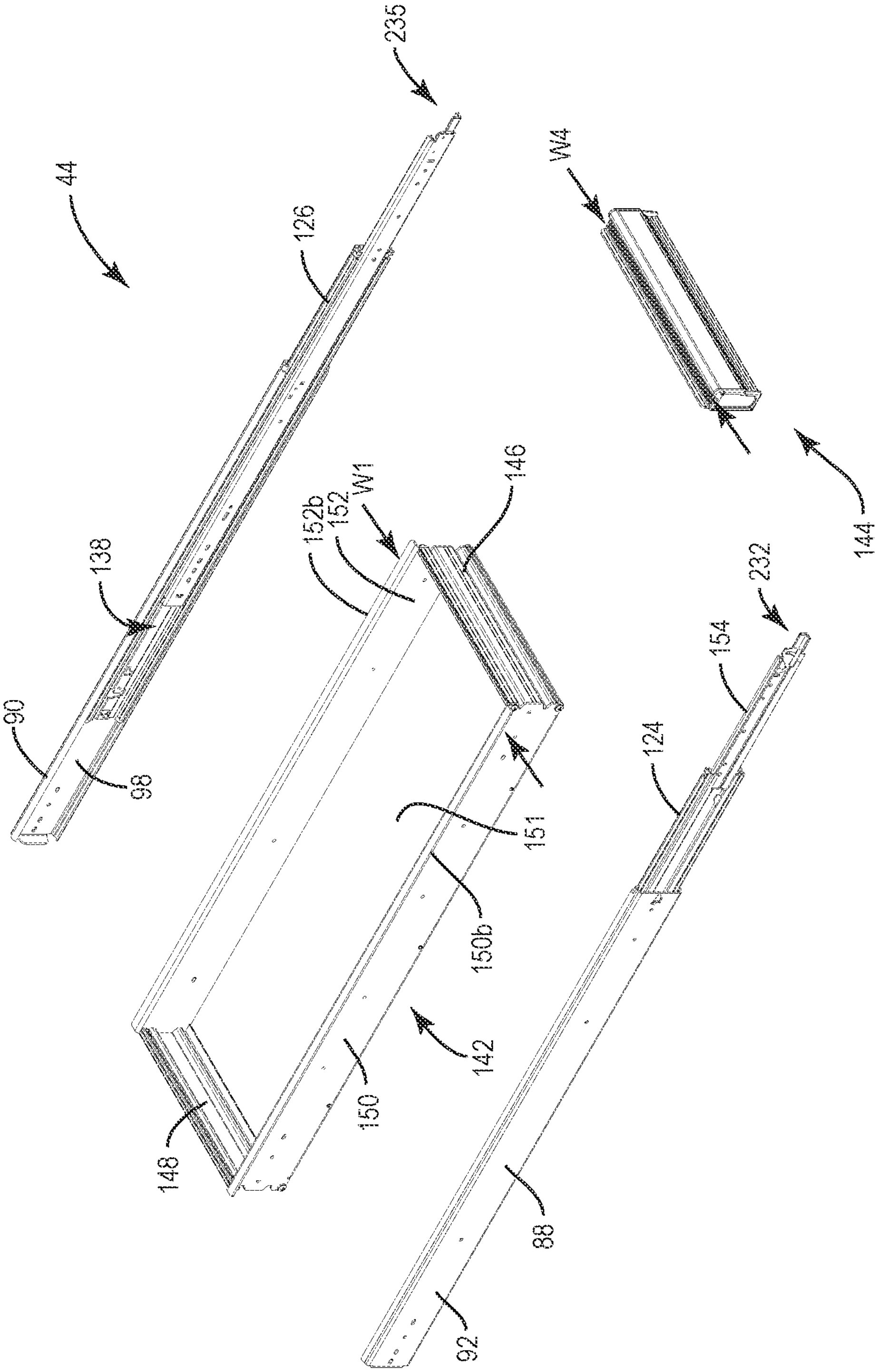
FIG. 6 is a perspective view of the drawer assembly shown in FIG. 3, with some parts separated.

In some embodiments, drawer assembly 44 is configured such that handle 144 (including portion 158, portion 160, end cap 534 and end cap 536) is spaced apart from an end surface 162 of member 88 and an end surface 164 of member 90 when drawer 140 is fully closed (pushed all the way inward relative to frame 42), as shown in FIG. 4, for example. That is, there is a gap 163 between end surface 162 and end cap 534 and/or portion 158 and a similar gap 165 between end surface 164 and end cap 536 and/or portion 158 when drawer 140 is fully closed (pushed all the way inward relative to frame 42). In some embodiments, gaps 163, 165 provide space for fastener installation. That is, gaps 163, 165 are present after drawer 140 has been pushed all the way inward relative to frame 42 and is prevented from being pushed any further inwardly relative to frame 42 (is fully closed). In some embodiments, gaps 163, 165 allow handle 144 to be spaced apart from frame 42 when drawer 140 is fully closed.

Figure 2:
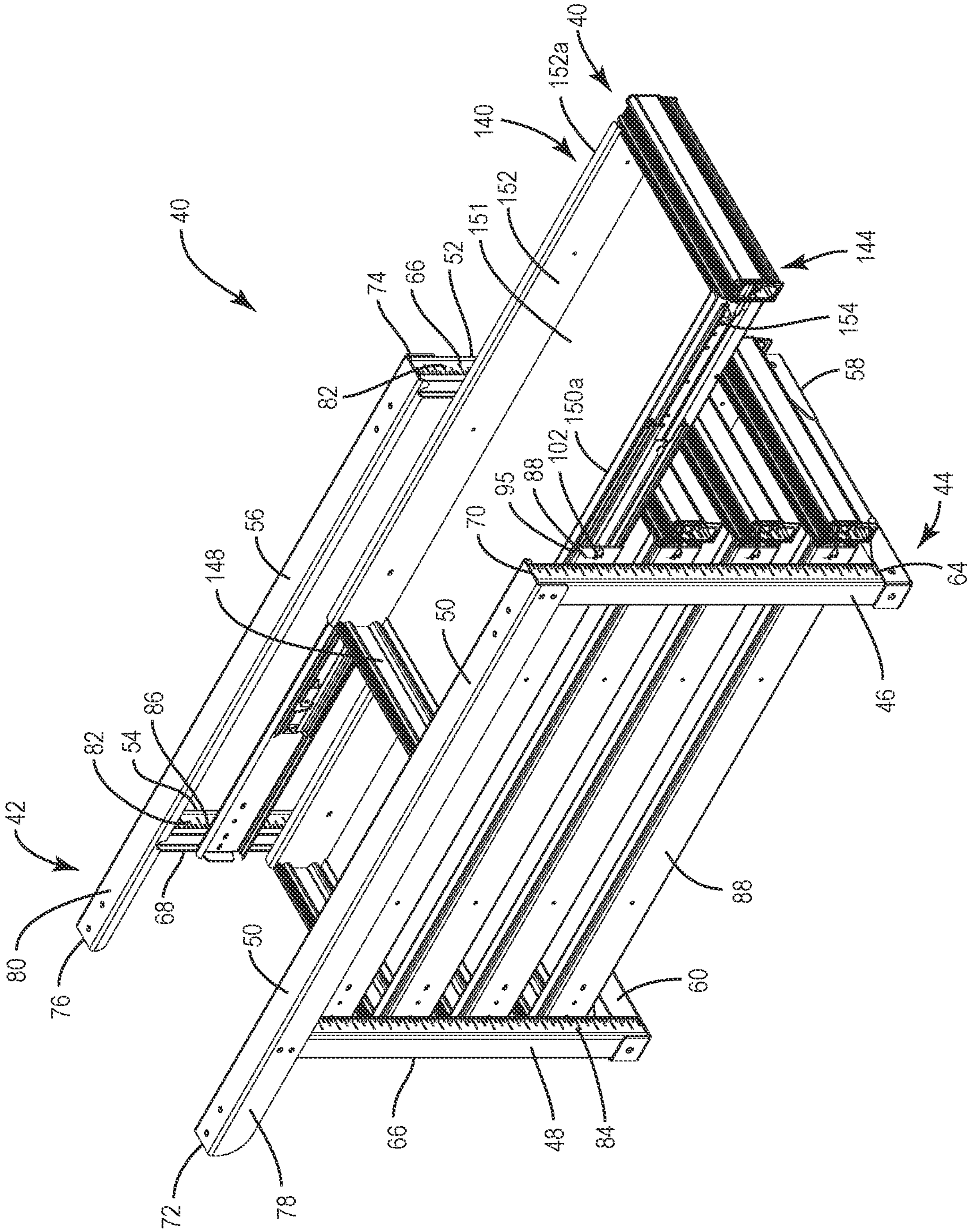
FIG. 2 is a perspective view of the shelving system shown in FIG. 1, with one of the drawer assemblies in an unlatched or open orientation.

As would be appreciated by one of ordinary skill in the art, spacing handle 144 apart from members 88, 90 when drawer 140 is fully closed reduces the likelihood of damage to handle 144 as drawer 140 is opened and closed since handle 144 will not come into contact with members 88, 90 when drawer 140 is either open or fully closed. In some embodiments, members 88, 90 are coupled to frame 42 such that flange 102 is positioned between outer surface 62 of member 46 and end surface 162 and flange 114 is positioned between outer surface 66 of member 52 and end surface 164 (FIGS. 1 and 2).

Figure 23:
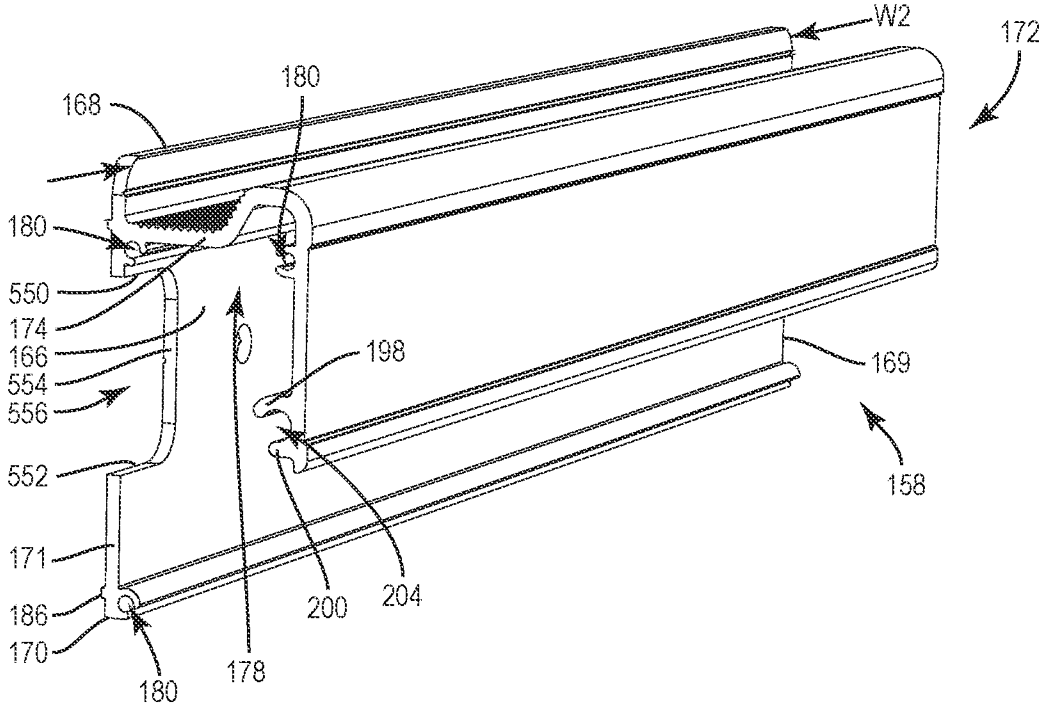
FIG. 23 is a perspective view of a component of the drawer assembly shown in FIG. 3.
Figure 24:
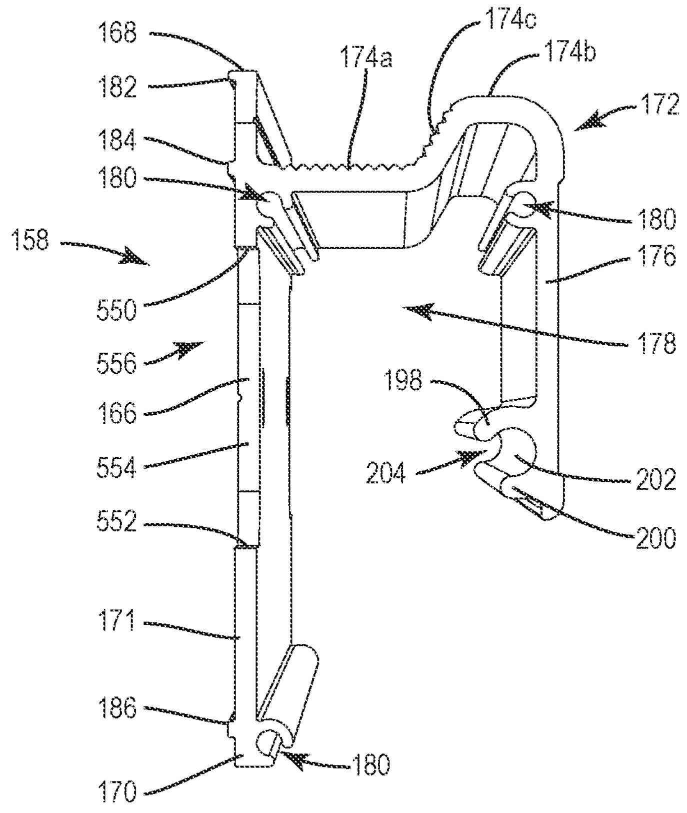
FIG. 24 is a perspective view of the component shown in FIG. 23.

Portion 158 includes a wall 166 having a top end 168 and an opposite bottom end 170, as shown in FIGS. 23-24, for example. Wall 166 extend from a first end 169 to an opposite second end 171. Portion 158 includes an extension 172 extending from end 168. Extension 172 includes a wall 174 that extends directly from wall 166 and a wall 176 that extends from an end of wall 174. Surfaces of walls 166, 174, 176 define a cavity 178 configured for disposal of portion 160 when drawer assembly 44 in an unlatched or open orientation, as discussed herein. In some embodiments, a portion 174*a* of wall 174 extends perpendicular to wall 166 and wall 176 extends parallel to wall 166. Wall 174 includes a portion 174*b* and an inclined ramp 174*c* that extends from portion 174*a* to portion 174*b*. Ramp 174*c* and/or portion 174*b* define a gripping portion of handle 144. That is, an operator may place tips of one or more of his or her fingers on ramp 174*c* when pulling drawer assembly 44 toward the operator.

Portion 158 includes one or a plurality of grooves 180 that each extend parallel to one another and are configured for disposal of fasteners to couple end caps 534, 536 to portion 158. For example, in some embodiments, fasteners, such as, for example, screws 188 are inserted through end cap 534 and into grooves 180 to couple end cap 534 to one end of handle 144 and screws 188 are inserted through end cap 536 and into grooves 180 to couple end cap 536 to an opposite end of handle 144. In some embodiments, at least one of grooves 180 extends the entire width of portion 158.

Figure 7:
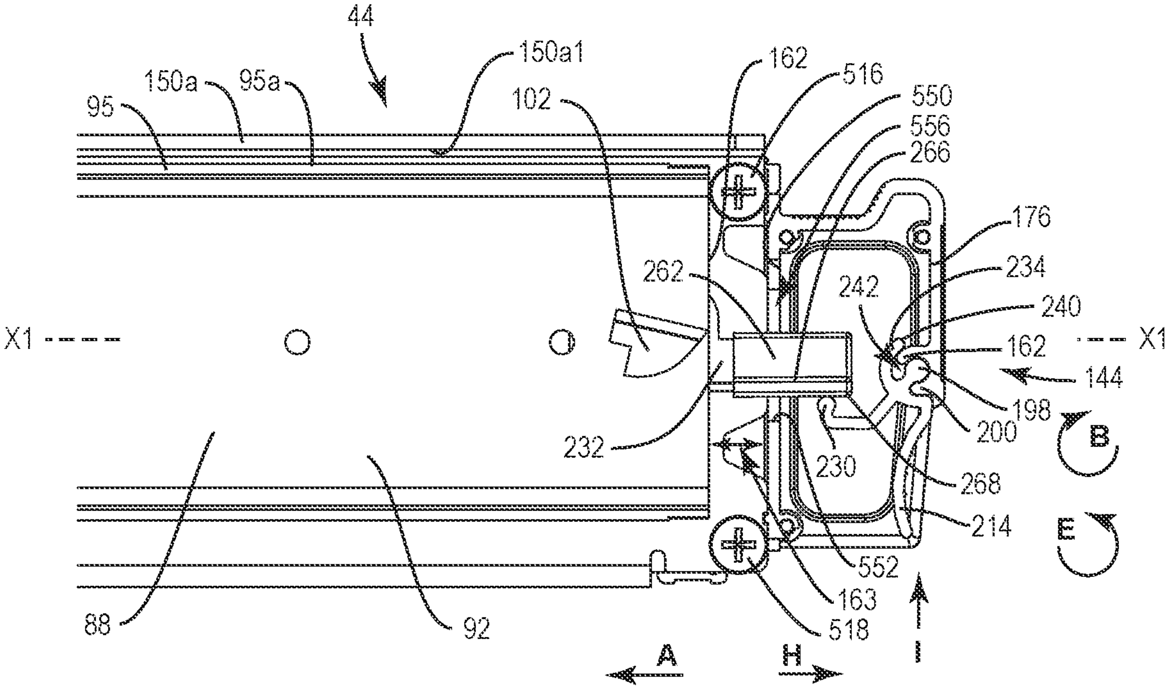
FIG. 7 is a side view of a portion of the drawer assembly shown in FIG. 3, with the drawer assembly in the latched or closed orientation.
Figure 8:
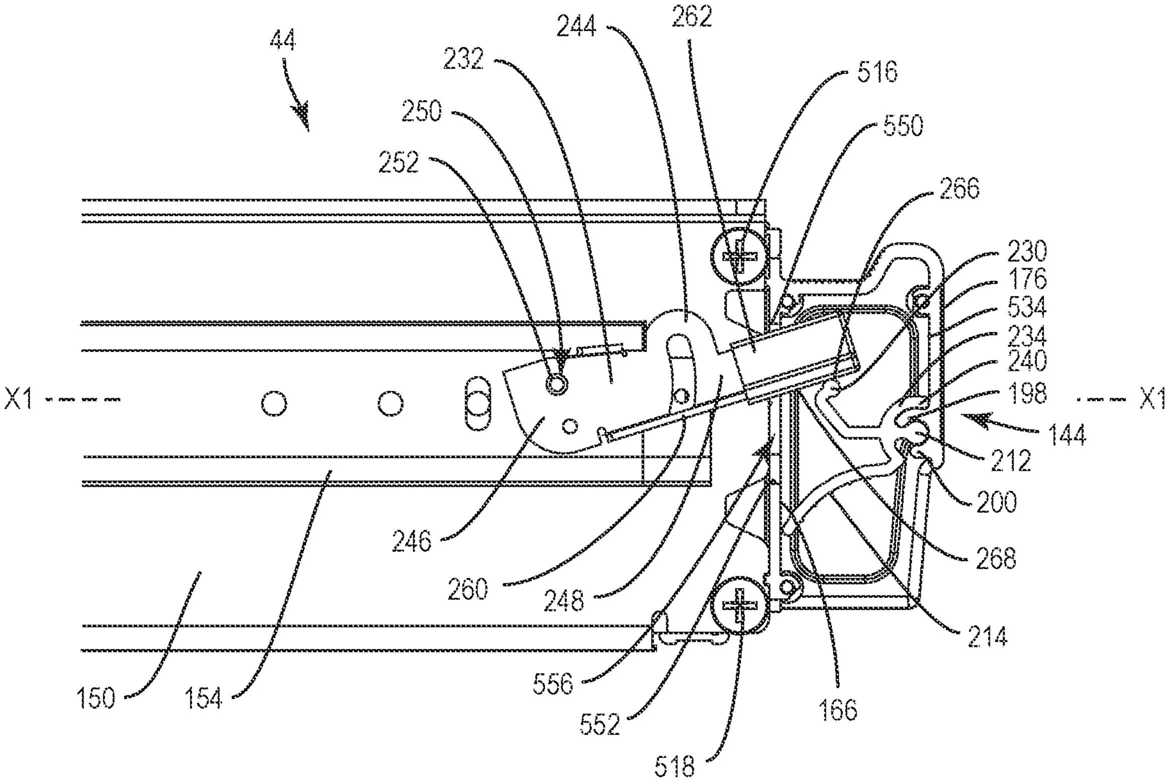
FIG. 8 is a side view of a portion of the drawer assembly shown in FIG. 3, with the drawer assembly in the unlatched or open orientation.

In some embodiments, at least one of grooves 180 has a length that is equal to width W2. In some embodiments, at least one of grooves 180 is uniform along the entire length of portion 158. In some embodiments, at least one of grooves 180 has a uniform cross-sectional configuration along the entire length thereof. In some embodiments, an inner surface 190 of wall 176 is planar from groove 180 to an end surface 192 of wall 176. In some embodiments, wall 176 is free of any projections, protrusions, extensions, etc. that extend outwardly from inner surface 190 from groove 180 to end surface 192. In some embodiments, portion 160 is spaced apart from cavity 178 when drawer assembly 44 in a latched or closed orientation and is positioned within cavity 178 when drawer assembly 44 is in the unlatched or open orientation. That is, no part of portion 160 is positioned within cavity 178 when drawer assembly 44 in the latched or closed orientation, as shown in FIG. 7, and at least part of portion 160 is positioned within cavity 178 when drawer assembly 44 in the unlatched or open orientation, as shown in FIG. 8.

Figure 24A:
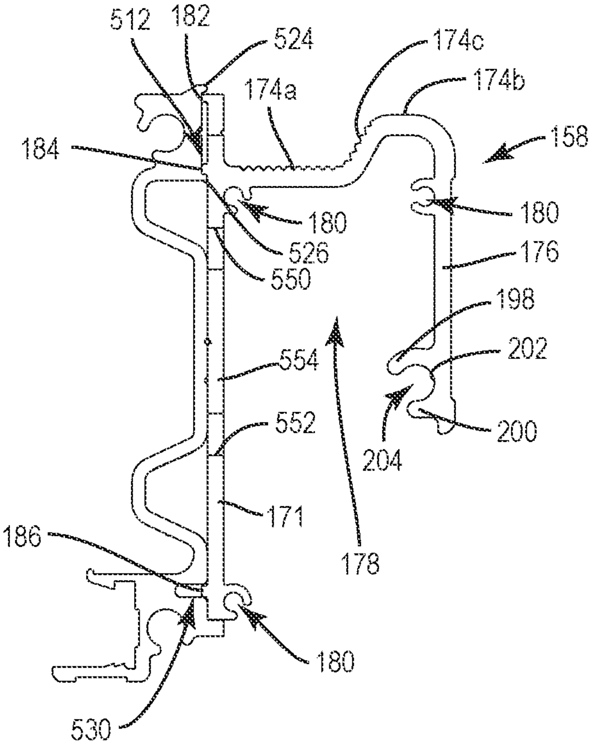
FIG. 24A is a perspective view of components of the drawer assembly shown in FIG. 3.

Portion 158 is configured to be coupled to end wall 146 of drawer 140 and includes spaced apart projections 182 each extending outwardly from wall 166, as shown in FIG. 24, for example. Projections 182, 184 are configured for disposal in channel 512 such that projection 182 directly engages flange 524 and projection 184 directly engages flange 526, as shown in FIG. 24A, for example. Projection 186 is disposed in slot 530 when projections are disposed in channel 512. The engagement of projections 182, 184 with flanges 524, 526 and the disposal of projection 186 in slot 530 couples portion 158 to end wall 146 of drawer 140 to prevent movement of portion 158 relative to frame 142 without the need for additional fasteners, welding, etc. In some embodiments, portion 158 can be variously connected with end wall 146, such as, for example, monolithic, integral connection, frictional engagement, threaded engagement, mutual grooves, screws, adhesive, nails, barbs, raised elements, spikes, clips, snaps, friction fittings, compressive fittings, expanding rivets, staples, fixation plates, key/keyslot, tongue in groove, dovetail, magnetic connection and/or posts.

Wall 176 includes a rib 198 and a rib 200 that is spaced apart rib 198 by an arcuate surface 202. Ribs 198, 200 each extend outwardly from an inner surface of wall 176. That is, ribs 198, 200 each extend outwardly from the inner surface wall 176. Arcuate surface 202 defines a passageway 204 having a length that is equal to width W2. That is, passageway 204 extends the entire width of portion 158. In some embodiments, passageway 204 is uniform along the entire length of passageway 204. In some embodiments, passageway 204 has a uniform cross-sectional configuration along the entire length of passageway 204.

Figure 23A:
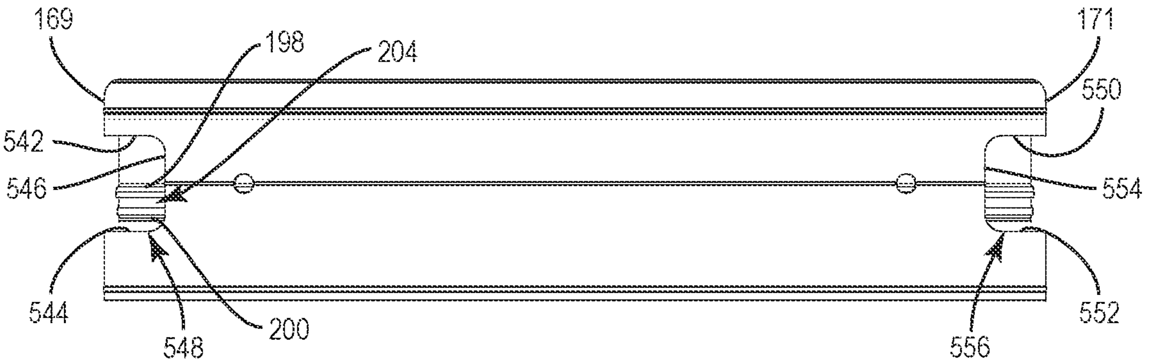
FIG. 23A is a rear view of the component shown in FIG. 23.

Portion 158 includes spaced apart surfaces 542, 544 and a surface 546 that connects surface 542 and surface 544, as best shown in FIG. 23A. Surfaces 542, 544 extend parallel to one another and surface 546 extends perpendicular to surfaces 542, 544. Surfaces, 542, 544, 546 define a cutout 548 that extends into end 169. Portion 158 further includes spaced apart surfaces 550, 552 and a surface 554 that connects surface 550 and surface 552. Surfaces 550, 552 extend parallel to one another and surface 554 extends perpendicular to surfaces 550, 552. Surfaces, 550, 552, 554 define a cutout 556 that extends into end 171.

Figure 25:
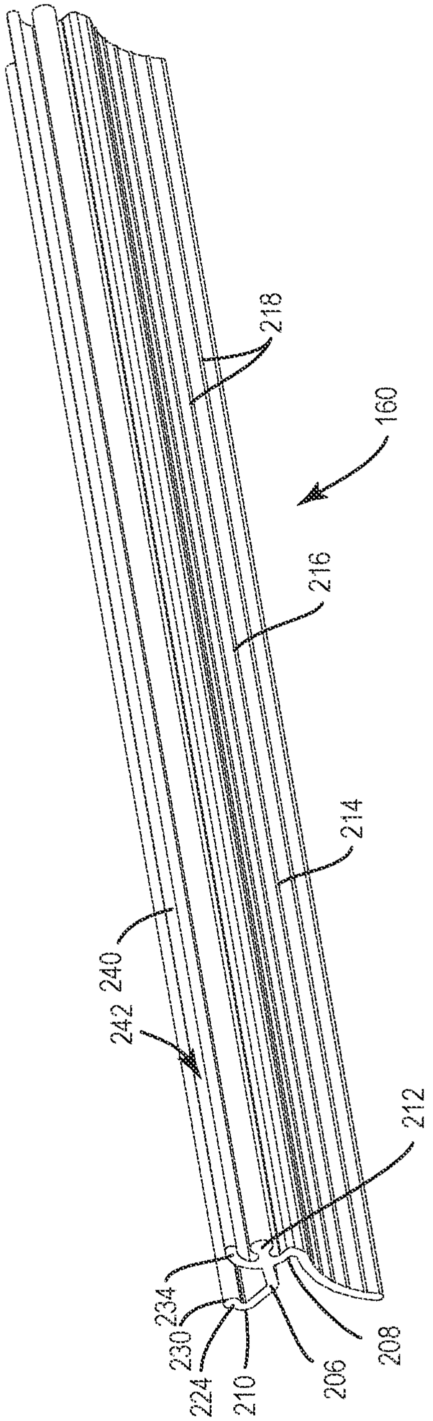
FIG. 25 is a perspective view of a component of the drawer assembly shown in FIG. 3.
Figure 26:
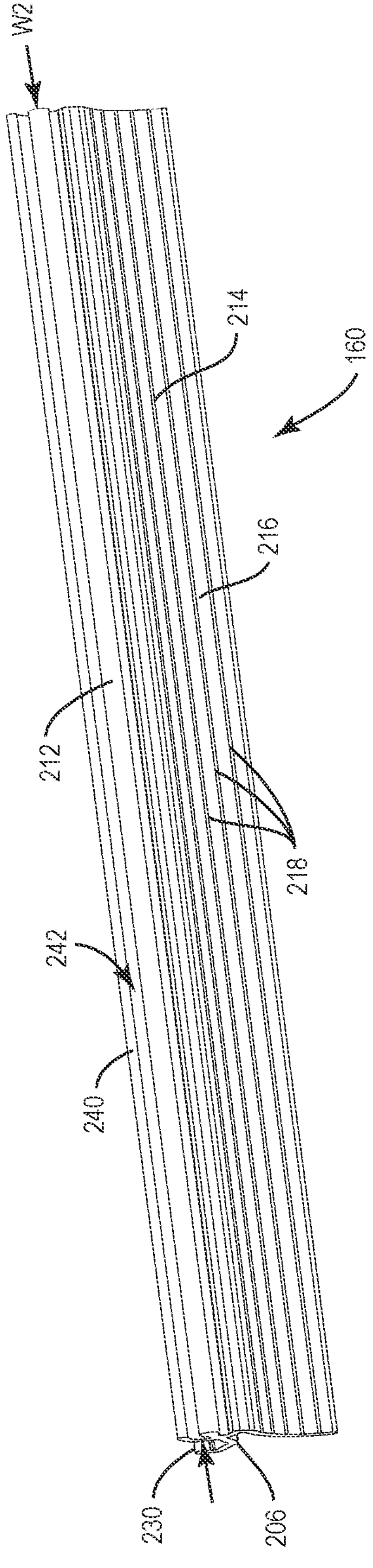
FIG. 26 is a perspective view of the component shown in FIG. 25.
Figure 27:
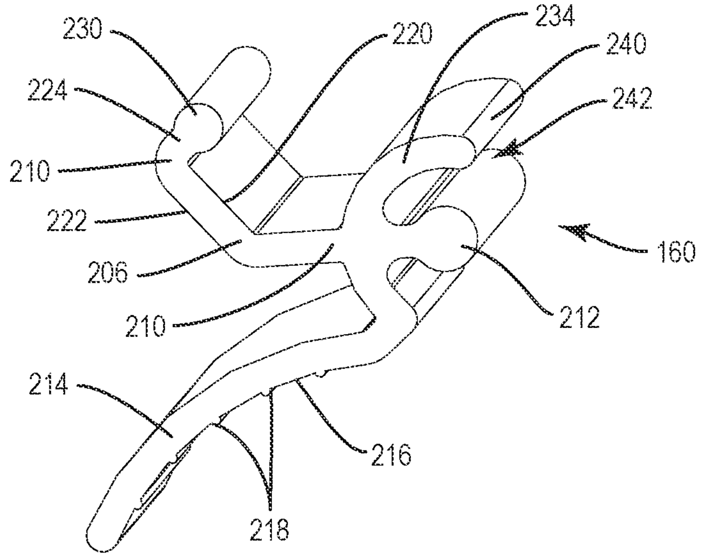
FIG. 27 is a side view of the component shown in FIG. 25.
Figure 28:
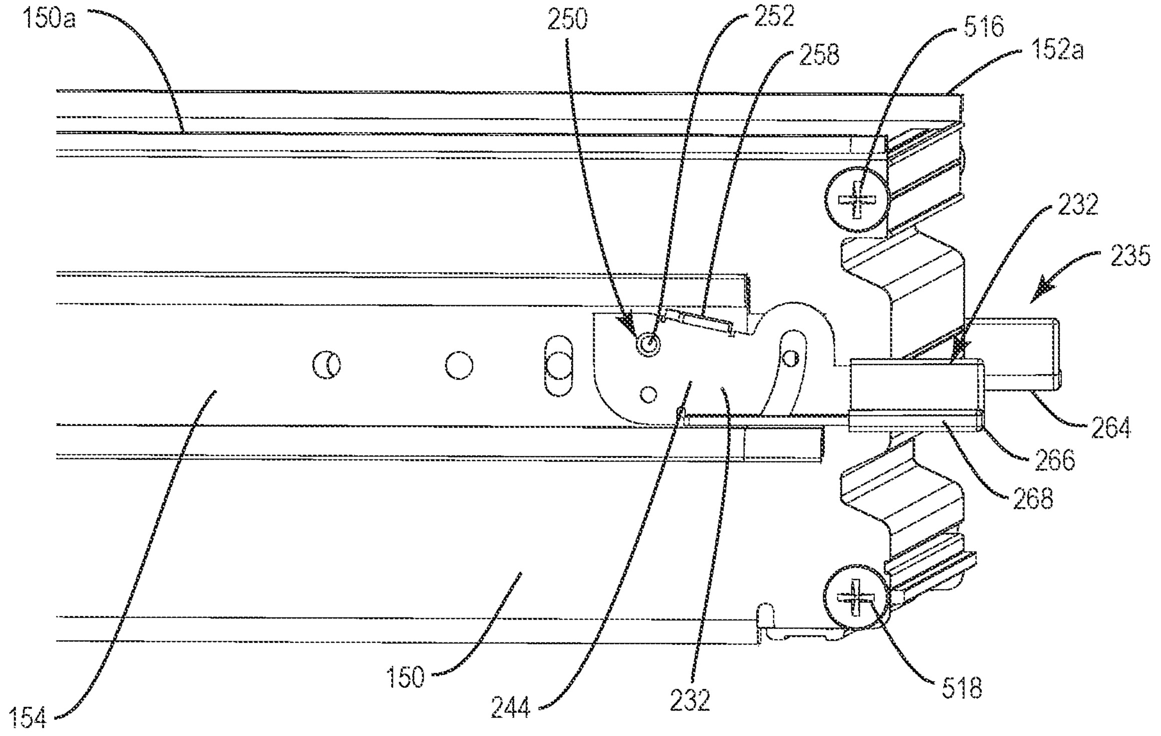
FIG. 28 is a perspective view of components of the drawer assembly shown in FIG. 3.

Portion 160 has a maximum width that is equal to a maximum width of portion 158. That is, portions 158, 160 each have width W2. Portion 160 includes a top wall 206 having an end 208 and an opposite end 210, as shown in FIGS. 25 and 26, for example. End 208 includes a bulbous portion 212 that is configured for rotatable disposal in passageway 204, as discussed herein. Portion 160 includes a front wall 214 that extends downwardly from end 208. In some embodiments, wall 214 includes an outer surface 216 and a plurality of spaced apart protrusions 218 that extend outwardly from outer surface 216. Protrusions 218 are configured to facilitate gripping of portion 160, as discussed herein. In some embodiments, protrusions 218 are arcuate and/or extend the entire width of portion 160. In some embodiments, at least one of protrusions 218 has width W2. Surface 216 is concavely curved to facilitate pushing of wall 214, as discussed herein.

Wall 206 includes a top surface 220 and an opposite bottom surface 222. Portion 160 includes an extension 224 that extends outwardly from surface 220 and includes a bulbous end portion 230. Portion 230 is configured for engagement with a release lever, such as, for example, a drawer release 232 to apply an upward force to drawer release 232 to move drawer assembly 44 between the latched or closed orientation to the unlatched or open orientation, as discussed herein. Portion 230 is monolithically and/or integrally formed with other parts of portion 160, such as, for example, wall 214 such that portion 230 cannot be removed or separated from wall 214 without breaking or damaging portion 230 and/or wall 214. As such, the component (portion 160) of handle 144 that is moved relative to portion 158 is the same component that applies an upward force on drawer releases to move drawer assembly 44 between the latched or closed orientation and the unlatched or open orientation, as discussed herein.

Portion 160 includes an extension 234 extending outwardly from surface 222 and including an end portion 240. Portion 230 is configured for engagement with drawer release 232 and a drawer release 235 to apply an upward force to drawer releases 232, 235 to move drawer assembly 44 between the latched or closed orientation and the unlatched or open orientation, as discussed herein. Surface 220 and extension 234 define an arcuate passage 242 configured for movable disposal of rib 198 as drawer assembly 44 between the latched or closed orientation and the unlatched or open orientation, as discussed herein. In some embodiments, extension 234 and/or passage 242 is/are continuously curved. In some embodiments, portion 212, passage 240 and extensions 224, 234 each extend the entire width of portion 158. That is, portion 212, passage 240 and extensions 224, 234 each have width W2. In some embodiments, portion 212, passage 240 and extensions 224, 234 are each uniform along the entire width of portion 158. In some embodiments, portion 240 directly engages wall 176 of portion 158 when drawer assembly 44 in a latched or closed orientation, as shown in FIG. 7, and is spaced apart from wall 176 when drawer assembly 44 is in the unlatched or open orientation, as shown in FIG. 8. In some embodiments, portion 160 is not in contact with any biasing elements, such as, for example, springs that apply a force to portion 160 when drawer assembly 44 in a latched or closed orientation or when drawer assembly 44 is in the unlatched or open orientation.

Figure 29:
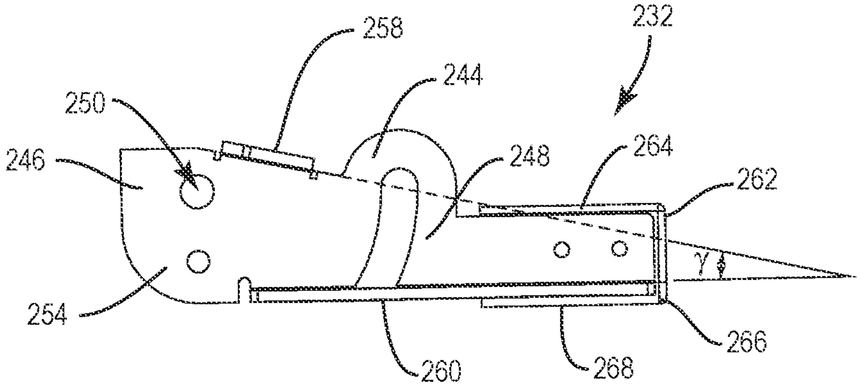
FIG. 29 is a perspective view of a component of the drawer assembly shown in FIG. 3.
Figure 30:
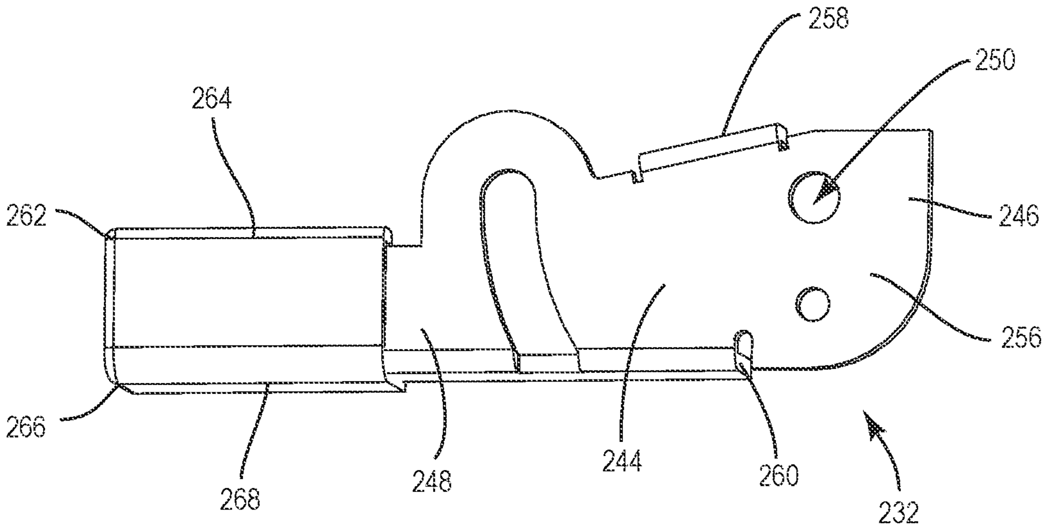
FIG. 30 is a perspective view of the component shown in FIG. 29.
Figure 31:
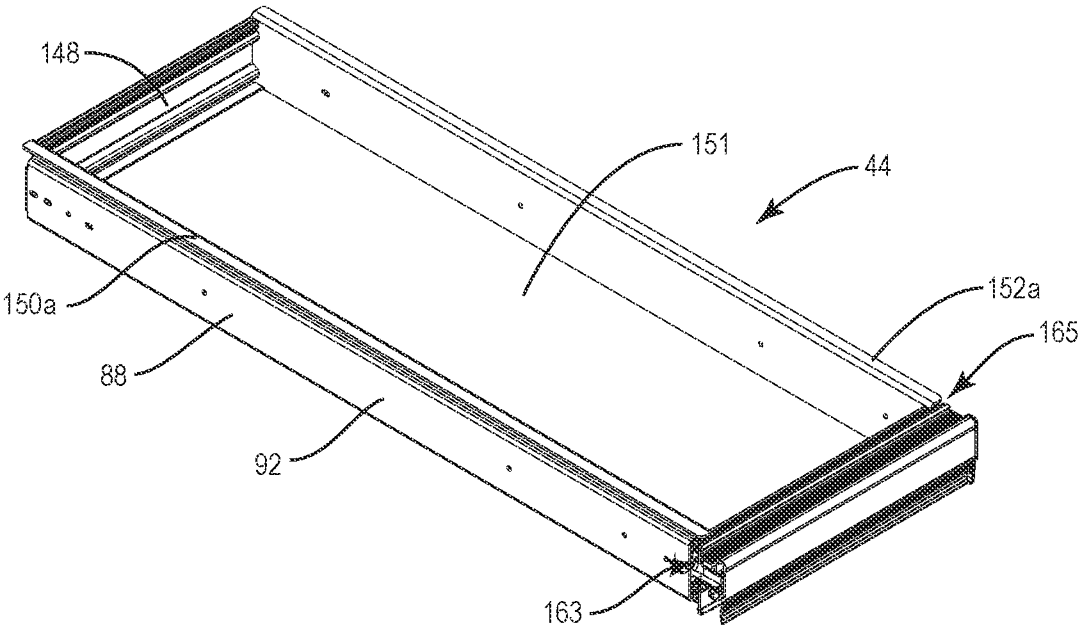
FIG. 31 is a perspective view of the drawer assembly shown in FIG. 3, with the drawer assembly in the latched or closed orientation and one or more parts removed.
Figure 32:
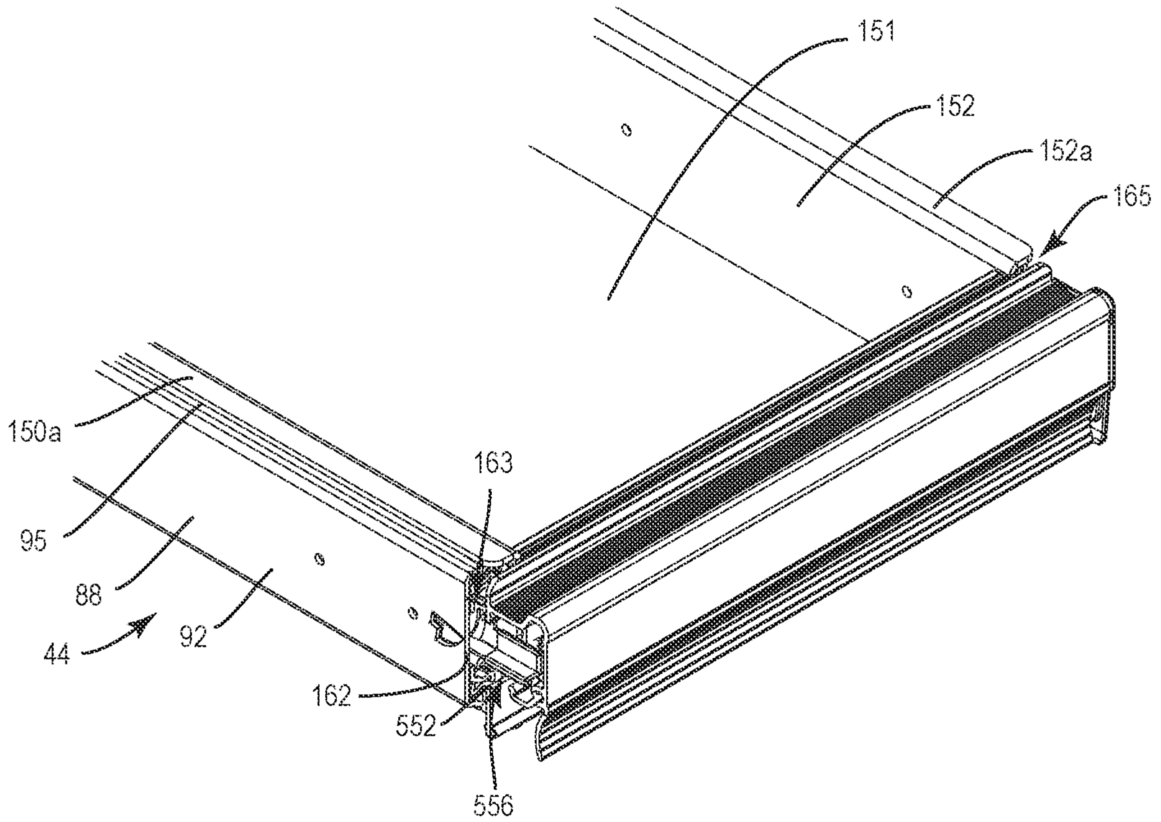
FIG. 32 is a perspective view of a portion of the drawer assembly shown in FIG. 3, with the drawer assembly in the latched or closed orientation and one or more parts removed.
Figure 32A:
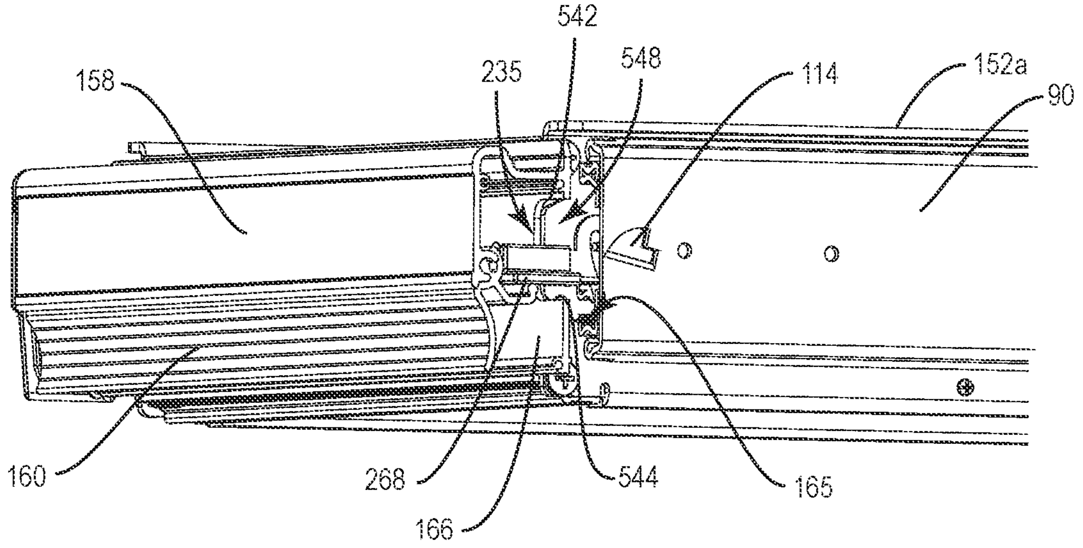
FIG. 32A is a perspective view, in part phantom, of a portion of the drawer assembly shown in FIG. 3, with the drawer assembly in the latched or closed orientation and one or more parts removed.

Drawer release 232 is coupled to drawer 140 such that a portion of drawer release 232 is positioned in a channel of rail 154 and drawer release 232 is rotatable relative to rail 154 and frame 142. Drawer release 232 includes a body, such as, for example, a plate 244 having an end 246 and an opposite end 248, as shown in FIGS. 29 and 30, for example. At least a portion of end 248 extends through cutout 556 such that drawer release 232 is spaced apart from surfaces 550, 552, 554 when drawer assembly 44 is in both the latched or closed orientation and the unlatched or open orientation, as discussed herein. In some embodiments, at least a portion of drawer release 232 is positioned in cavity 178 when drawer assembly 44 is in the unlatched or open orientation. End 248 is fixed relative to end 246. In some embodiments, plate 244 is monolithically and/or integrally formed. Drawer release 232 includes an opening 250 that extends through a thickness of plate 244. In some embodiments, a fastener, such as, for example, a rivet 252 extends through opening 250 and into rail 154 and/or sidewall 150 such that plate 244 is rotatable relative to rail 154 and sidewall 150 about rivet 252.

Plate 244 includes a side 254 and an opposite side 256. Drawer release 232 includes a flange 258 that extends outwardly from side 254 at a top portion of plate 244 and a flange 260 that extends outwardly from side 254 at a bottom portion of plate 244. Flange 258 defines a locking element configured to engage and disengage a locking element, such as, for example, flange 102 of member 88 to move drawer assembly 44 between the latched or closed orientation and the unlatched or open orientation, as discussed herein. In some embodiments, flange 260 is non-parallel with flange 258. In some embodiments, flange 260 extends at an angle relative to flange 258. In some embodiments, flange 260 extends at an angle γ relative to flange 258. In some embodiments, angle γ is an angle. In some embodiments, angle γ is an angle between about 1 degree and about 65 degrees. In some embodiments, angle γ is an angle between about 10 degrees and about 65 degrees. In some embodiments, angle γ is an angle between about 10 degrees and about 55 degrees. In some embodiments, angle γ is an angle between about 10 degrees and about 45 degrees. In some embodiments, angle γ is an angle between about 20 degrees and about 30 degrees. In some embodiments, side 254 extends parallel to side 256 and at least one of flanges 258, 260 extend perpendicular to sides 254 and side 256.

In some embodiments, drawer release 232 includes an optional sleeve 262 having a section 264 positioned over a portion of end 248 and a section 266 positioned over a portion of flange 260. Sleeve 262 is configured for direct engagement with portion 230 of extension 224 by pushing portion 160 inwardly to move portion 160 relative to portion 158 in the direction shown by arrow A in FIG. 7 such that portion 160 rotates relative to portion 158 in the direction shown by arrow B in FIG. 7 and extension 224, which contacts a bottom surface of sleeve 262 (or a bottom surface of flange 260 when sleeve 262 is omitted), applies an upward force to flange 260 to move drawer assembly 44 from the latched or closed orientation to the unlatched or open orientation, as discussed herein. In some embodiments, sleeve 262 may be made at least in part from a material, such as, for example, plastic or an elastomeric material to enhance gripping of portion 230 with sleeve 262.

Figure 34:
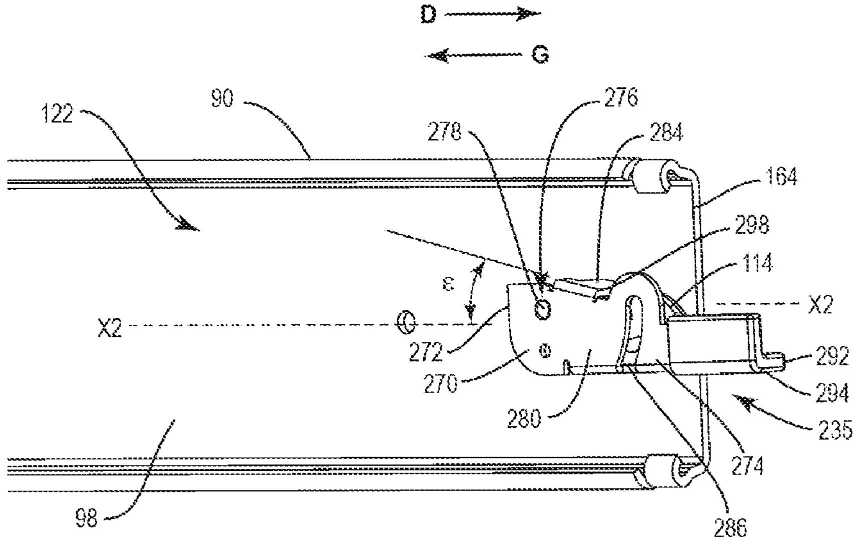
FIG. 34 is a perspective view showing the orientation of components of the drawer assembly shown in FIG. 3 when the drawer assembly in the latched or closed orientation.
Figure 36:
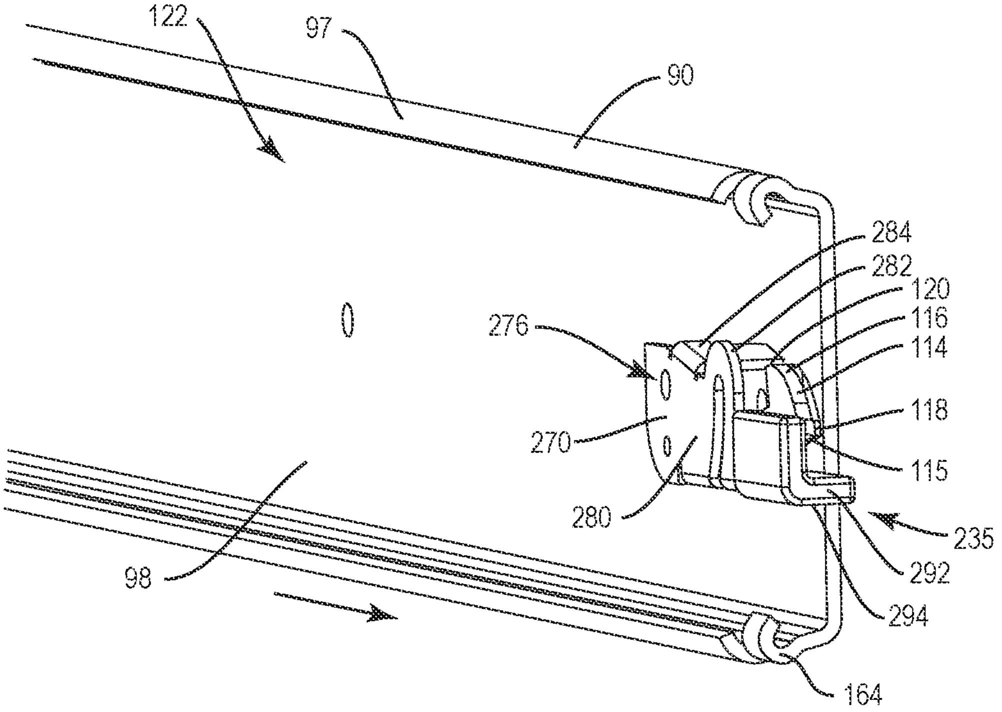
FIG. 36 is a perspective view showing the orientation of components of the drawer assembly shown in FIG. 3 when the drawer assembly in the latched or closed orientation.
Figure 37:
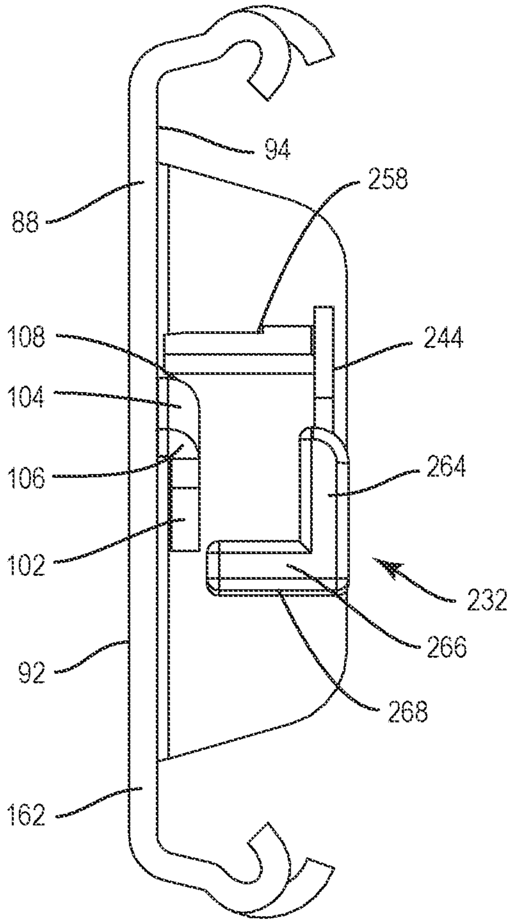
FIG. 37 is an end view showing the orientation of components of the drawer assembly shown in FIG. 3 when the drawer assembly in the latched or closed orientation.
Figure 38:
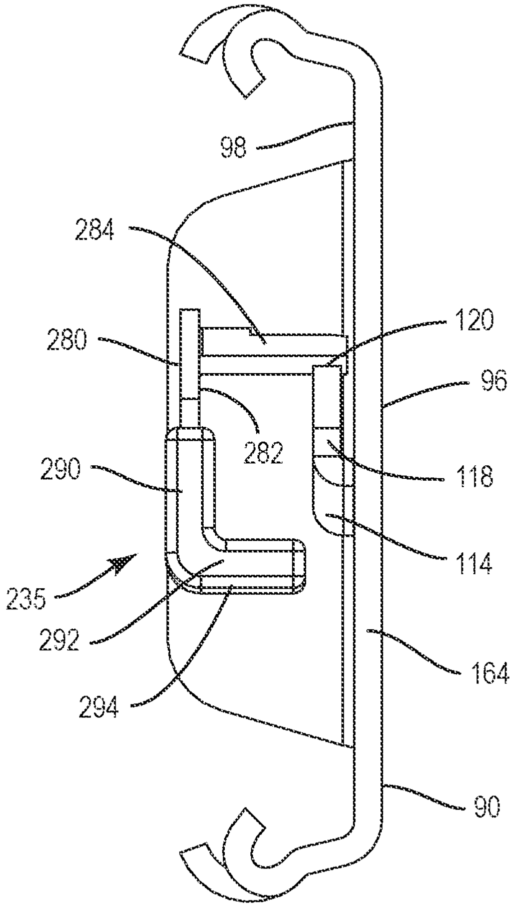
FIG. 38 is an end view showing the orientation of components of the drawer assembly shown in FIG. 3 when the drawer assembly in the latched or closed orientation.
Figure 39:
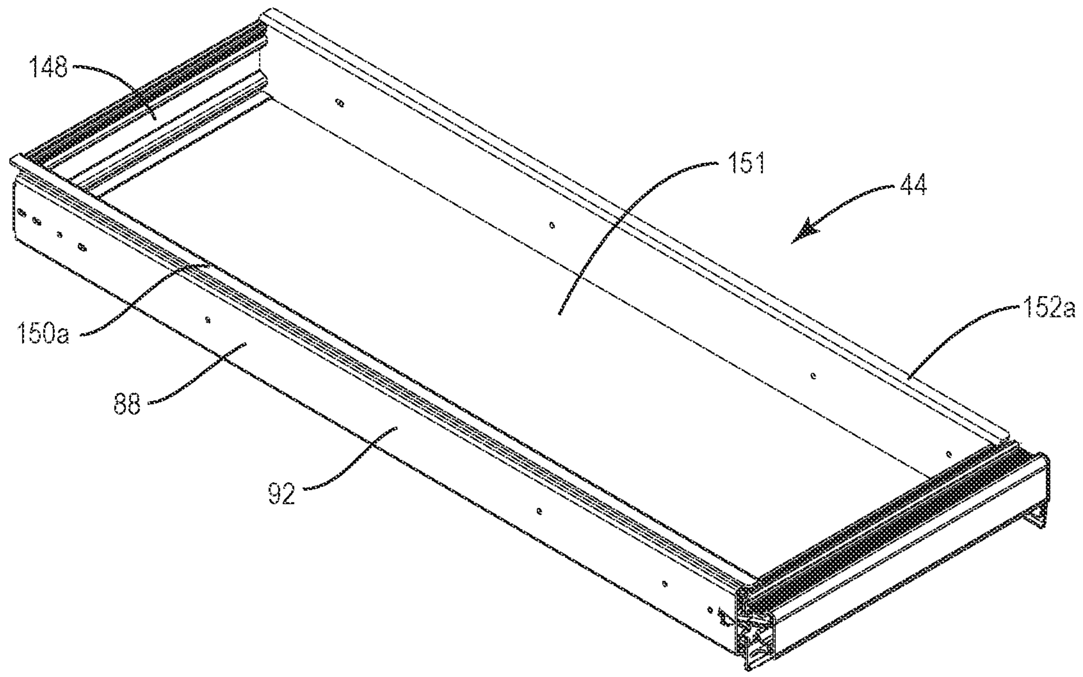
FIG. 39 is a perspective view of the drawer assembly shown in FIG. 3, with the drawer assembly in the unlatched or open orientation and one or more parts removed.
Figure 40:
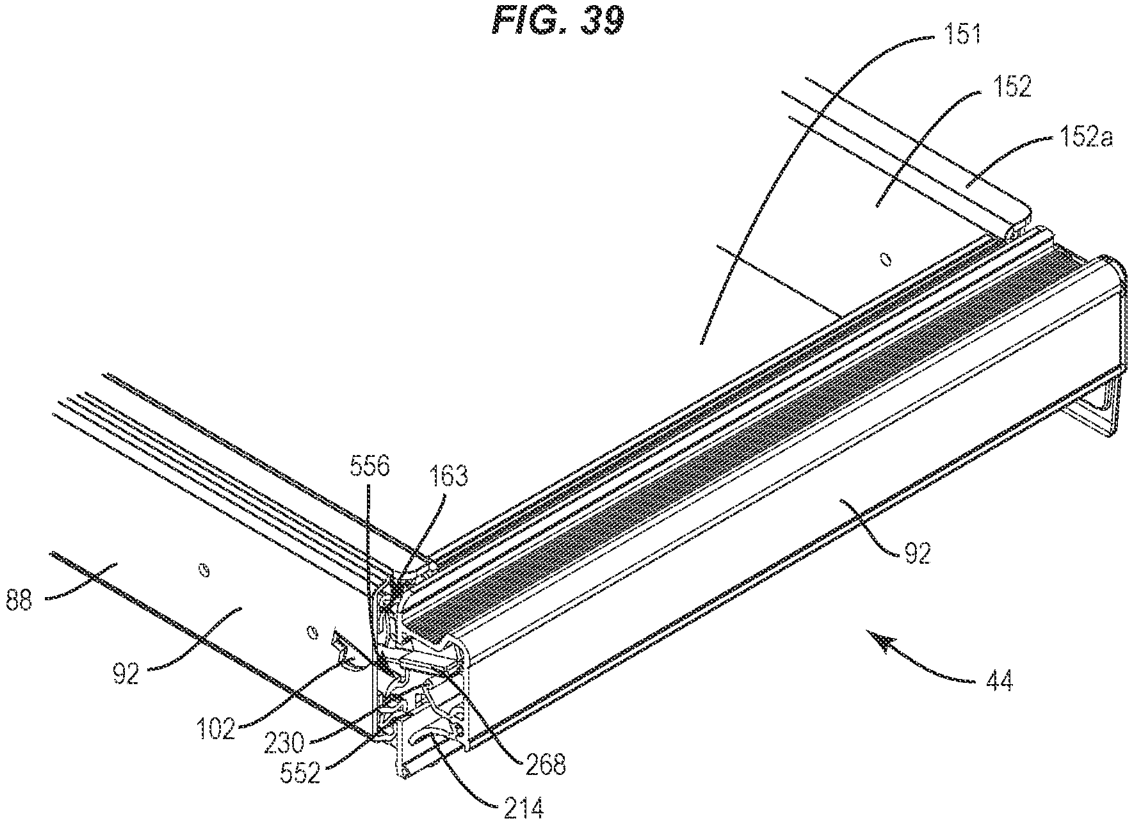
FIG. 40 is a perspective view 238 of a portion of the drawer assembly shown in FIG. 3, with the drawer assembly in the unlatched or open orientation and one or more parts removed.
Figure 40A:
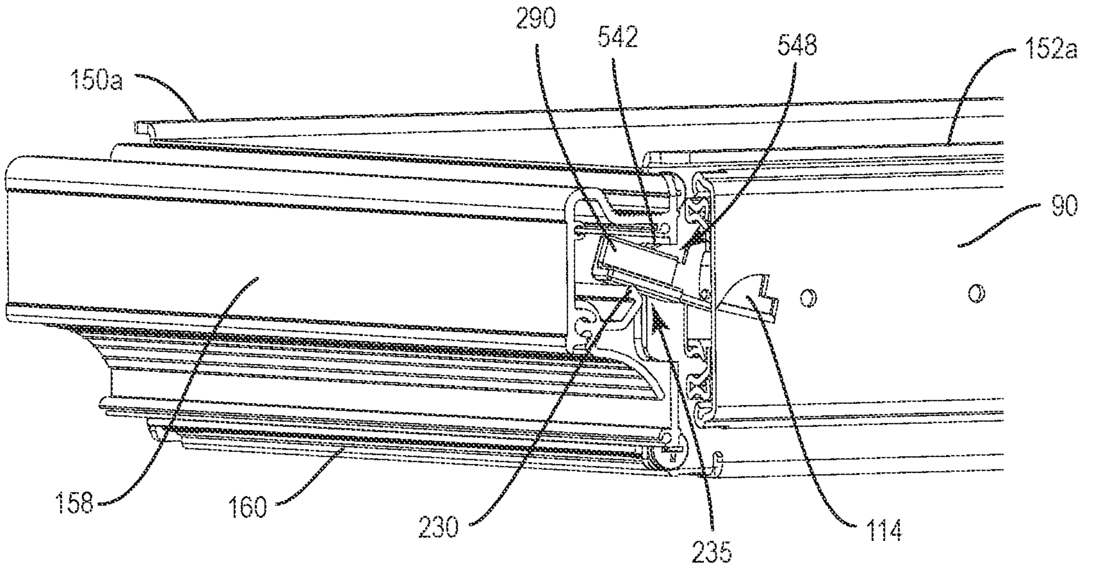
FIG. 40A is a perspective view 238 of a portion of the drawer assembly shown in FIG. 3, with the drawer assembly in the unlatched or open orientation and one or more parts removed.
Figure 41:
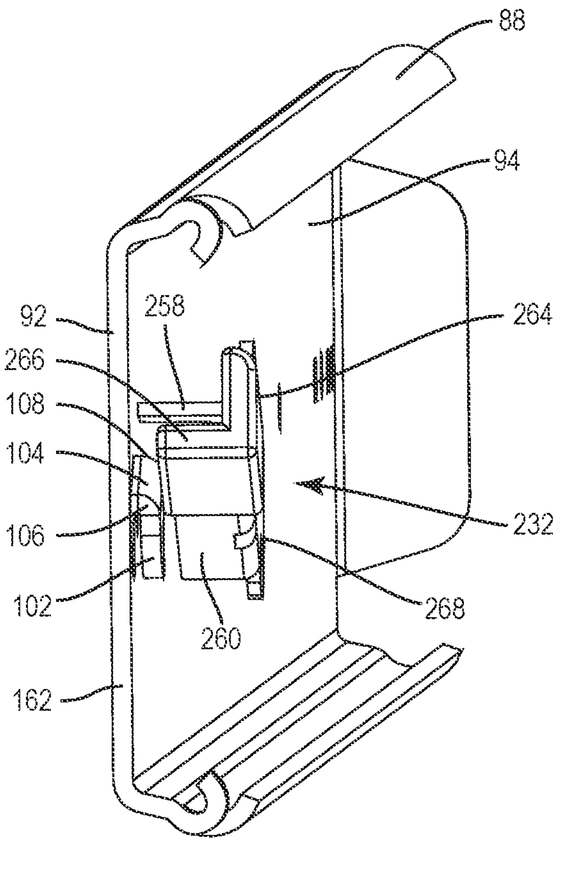
FIG. 41 is a perspective view showing the orientation of components of the drawer assembly shown in FIG. 3 when the drawer assembly in the unlatched or open orientation.
Figure 42:
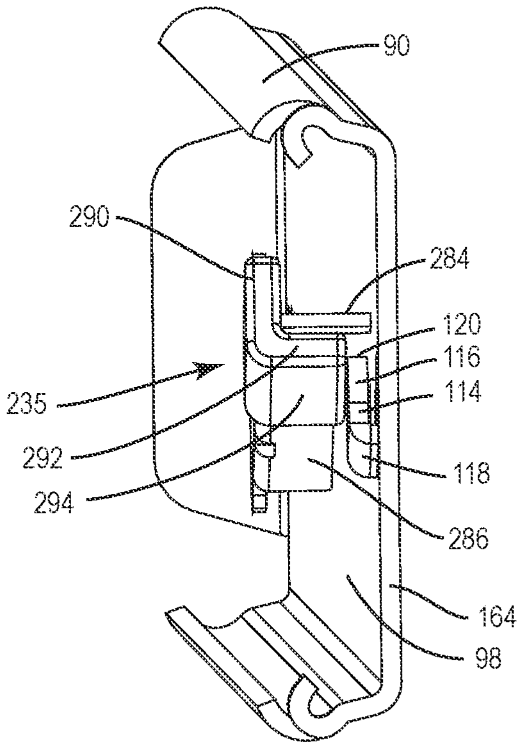
FIG. 42 is a perspective view showing the orientation of components of the drawer assembly shown in FIG. 3 when the drawer assembly in the unlatched or open orientation.
Figure 43:
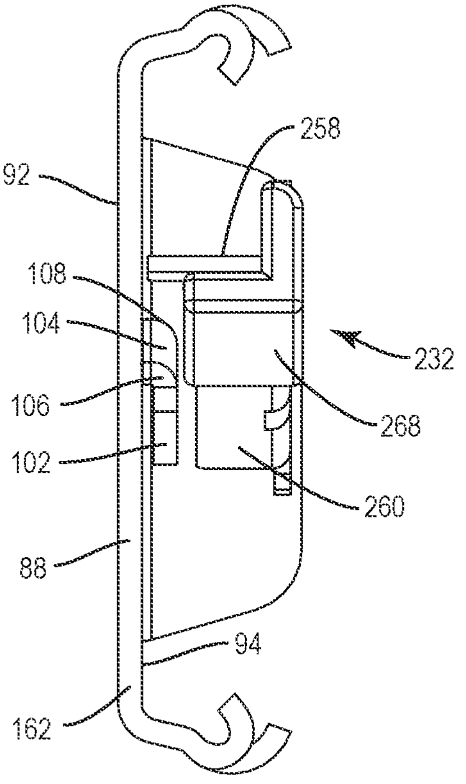
FIG. 43 is an end view showing the orientation of components of the drawer assembly shown in FIG. 3 when the drawer assembly in the unlatched or open orientation.
Figure 44:
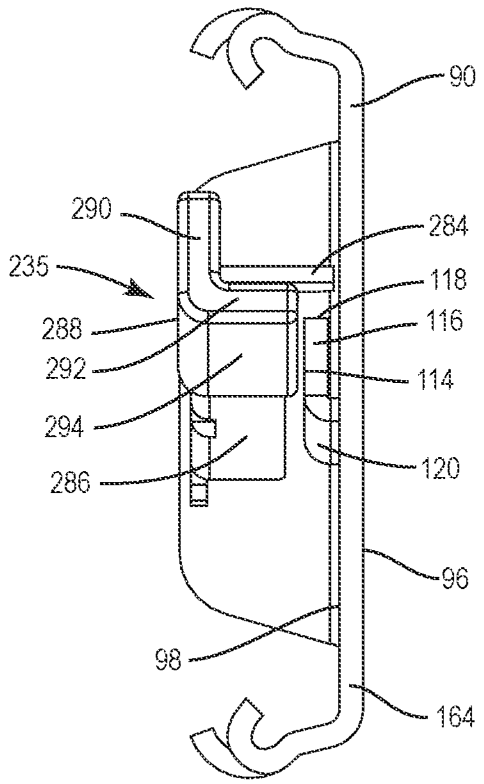
FIG. 44 is an end view showing the orientation of components of the drawer assembly shown in FIG. 3 when the drawer assembly in the unlatched or open orientation.
Figure 45:
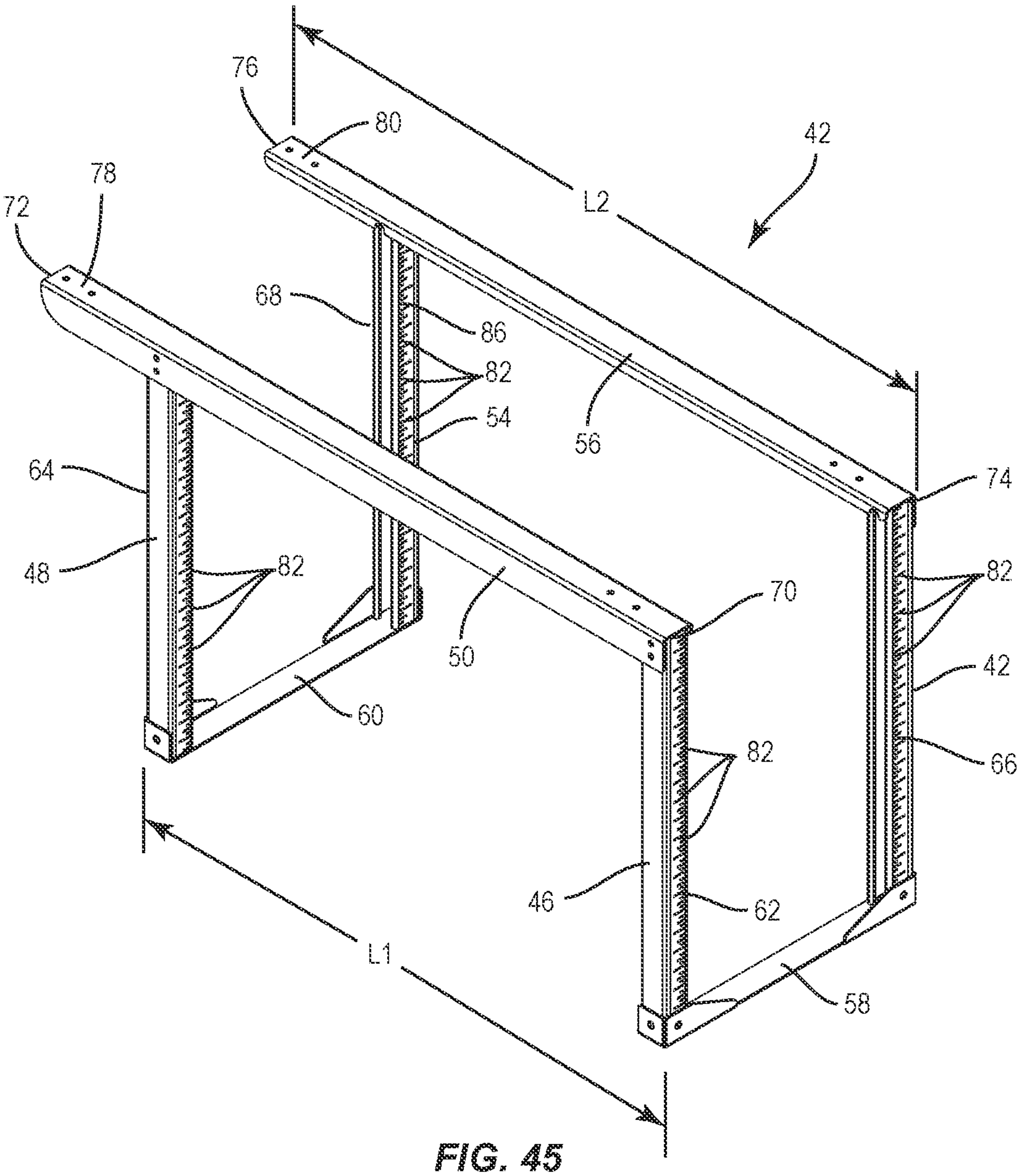
FIG. 45 is a perspective view of one embodiment of a component of the shelving system shown in FIG. 1.
Figure 46:
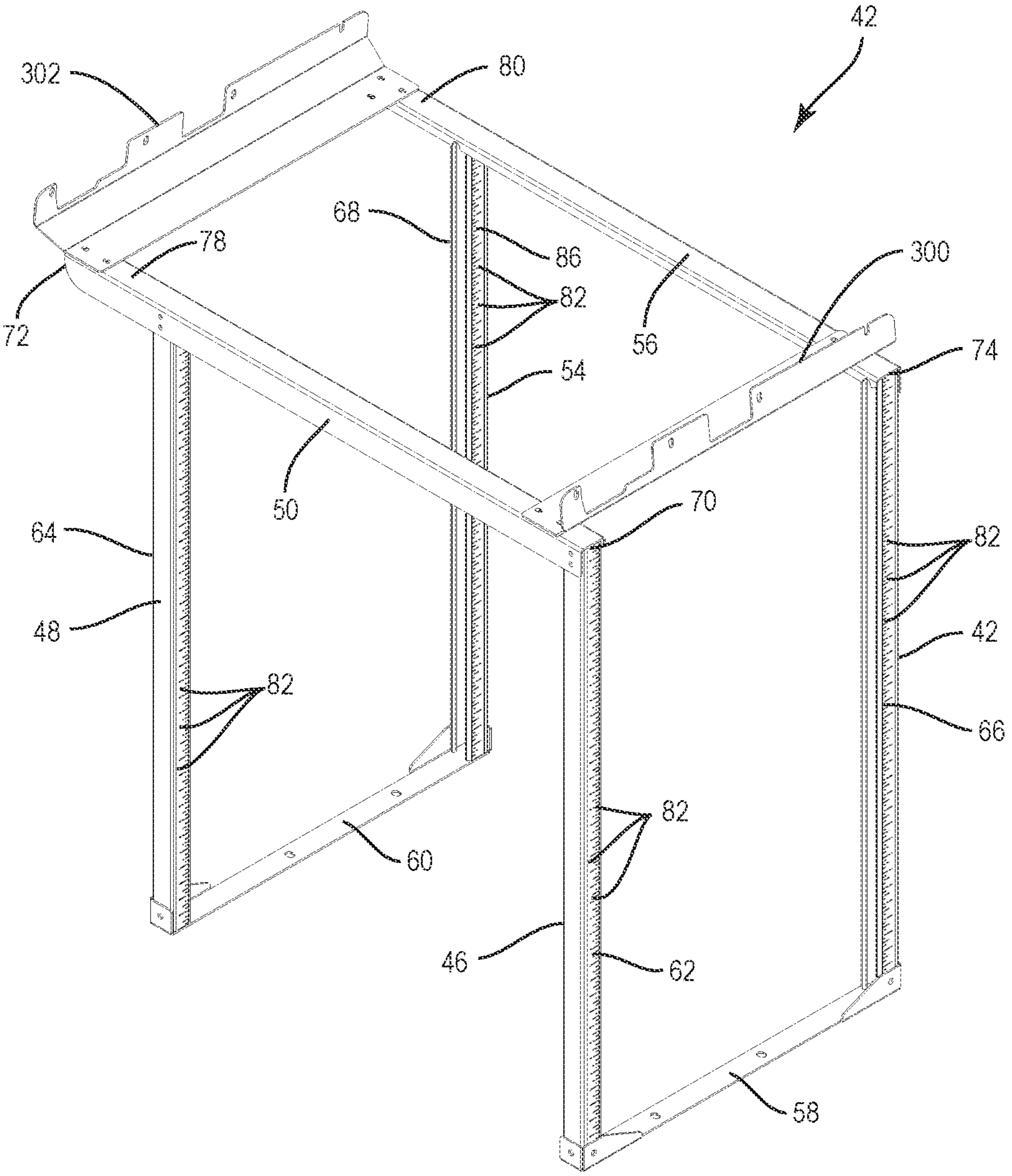
FIG. 46 is a perspective view of one embodiment of a component of the shelving system shown in FIG. 1.

Drawer release 235 is coupled to drawer 140 such that a portion of drawer release 235 is positioned in a channel of rail 156 and drawer release 235 is rotatable relative to rail 156 and frame 142. Drawer release 235 includes a body, such as, for example, a plate 270 having an end 272 and an opposite end 274, as shown in FIGS. 34 and 36, for example. End 274 is fixed relative to end 272 and at least a portion of end 274 extends through cutout 548 such that drawer release 232 is spaced apart from surfaces 524, 544, 546 when drawer assembly 44 is in both the latched or closed orientation and the unlatched or open orientation, as discussed herein. In some embodiments, at least a portion of drawer release 235 is positioned in cavity 178 when drawer assembly 44 is in the unlatched or open orientation. In some embodiments, plate 270 is monolithically and/or integrally formed. Drawer release 235 includes an opening 276 that extends through a thickness of plate 270. In some embodiments, a fastener, such as, for example, a rivet 278 extends through opening 276 and into rail 156 and/or sidewall 152 such that plate 270 is rotatable relative to rail 156 and sidewall 152 about rivet 278.

Plate 270 includes a side 280 and an opposite side 282. Drawer release 235 includes a flange 284 that extends outwardly from side 282 at a top portion of plate 270 and a flange 286 that extends outwardly from side 282 at a bottom portion of plate 270. Flange 284 defines a locking element configured to engage and disengage a locking element, such as, for example, flange 114 of member 90 to move drawer assembly 44 between the latched or closed orientation and the unlatched or open orientation, as discussed herein. In some embodiments, flange 286 is non-parallel with flange 284. In some embodiments, flange 286 extends at an angle relative to flange 284. In some embodiments, flange 286 extends at an acute angle relative to flange 258. In some embodiments, flange 286 extends at angle γ relative to flange 284. In some embodiments, drawer release 235 is structurally identical to drawer release 232.

In some embodiments, drawer release 235 includes an optional sleeve 288 having a section 290 positioned over a portion of end 274 and a section 292 positioned over a portion of flange 286. Section 266 is configured for direct engagement with portion 230 of extension 224 by pushing portion 160 inwardly to move portion 160 relative to portion 158 in the direction shown by arrow A in FIG. 7 such that portion 160 rotates relative to portion 158 in the direction shown by arrow B in FIG. 7 and extension 224, which contacts a bottom surface of section 266 (or a bottom surface of flange 286 when sleeve 288 is omitted), applies an upward force to flange 286 to move drawer assembly 44 from the latched or closed orientation to the unlatched or open orientation, as discussed herein. In some embodiments, sleeve 288 may be made at least in part from a material, such as, for example, an elastomeric material to enhance gripping of portion 230 with sleeve 288.

Portion 160 is coupled to portion 158 such that portion 212 is positioned in passageway 204 and at least a portion of rib 200 is positioned in passage 242. When portion 212 is positioned in passageway 204 and at least a portion of rib 200 is positioned in passage 242, portion 230 directly engages a bottom surface 268 of section 266 of sleeve 262 (or a bottom surface of flange 260 when sleeve 262 is omitted), as shown in FIGS. 7 and 8, for example, and portion 230 simultaneously directly engages a bottom surface 294 of section 292 of sleeve 288 (or a bottom surface of flange 286 when sleeve 288 is omitted). Portion 230 directly engages bottom surface 268 of section 266 of sleeve 262 (or the bottom surface of flange 260 when sleeve 262 is omitted) when drawer assembly 44 is in the latched or closed orientation, as shown in FIG. 7, and when drawer assembly 44 is in the unlatched or open orientation, as shown in FIG. 8. That is, portion 230 remains directly engaged with bottom surface 268 of section 266 of sleeve 262 (or the bottom surface of flange 260 when sleeve 262 is omitted) as drawer assembly 44 moves back and forth between the latched or closed orientation and the unlatched or open orientation.

Figure 33:
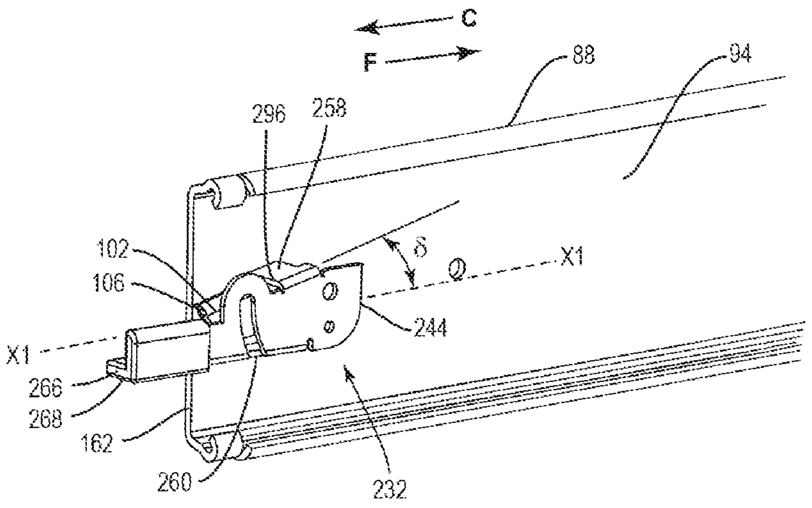
FIG. 33 is a perspective view showing the orientation of components of the drawer assembly shown in FIG. 3 when the drawer assembly in the latched or closed orientation.

Drawer assembly 44 is biased to the latched or closed orientation to prevent movement of drawer 140 relative to members 88, 90, as discussed herein. In particular, when drawer assembly 44 is in the latched or closed orientation, portion 230 directly engages bottom surface 268 of section 266 of sleeve 262 (or a bottom surface of flange 260 when sleeve 262 is omitted) such that flange 260 and bottom surface 268 of section 266 each extend parallel to axis X1, as shown in FIG. 33. Likewise, when drawer assembly 44 is in the latched or closed orientation, portion 230 directly engages bottom surface 294 of section 292 of sleeve 288 (or a bottom surface of flange 286 when sleeve 288 is omitted) such that flange 286 and bottom surface 294 of section 292 each extend parallel to axis X2, as shown in FIG. 34. When drawer assembly 44 is the latched or closed orientation, wall 214 of portion 160 is spaced apart from wall 166 of portion 158, as shown in FIG. 7, for example.

When drawer assembly 44 is in the latched or closed orientation, flange 258 extends at an angle δ relative to axis X1 (FIG. 33) such that a portion of flange 258, such as, for example, an end surface 296 of flange 258 directly engages end surface 108 of flange 104 to prevent drawer 140 from translating relative to member 88 along axis X1 in the direction shown by arrow C in FIG. 33. When drawer assembly 44 is in the latched or closed orientation, flange 284 extends at angle ε relative to axis X2 (FIG. 34) such that a portion of flange 284, such as, for example, an end surface 298 of flange 284 directly engages end surface 120 of flange 114 to prevent drawer 140 from translating relative to member 90 along axis X2 in the direction shown by arrow D in FIG. 34. In some embodiments, angle δ and/or angle ε is equal to angle α. In some embodiments, angle δ is equal to angle ε. In some embodiments, angle δ and/or angle ε is an acute angle. In some embodiments, angle δ and/or angle ε is an angle between about 1 degree and about 45 degrees. In some embodiments, angle δ and/or angle ε is an angle between about 1 degree and about 35 degrees. In some embodiments, angle δ and/or angle ε is an angle between about 1 degree and about 25 degrees. In some embodiments, angle δ and/or angle ε is an angle between about 1 degree and about 15 degrees. In some embodiments, angle δ and/or angle ε is an angle between about 1 degree and about 5 degrees.

Figure 3:
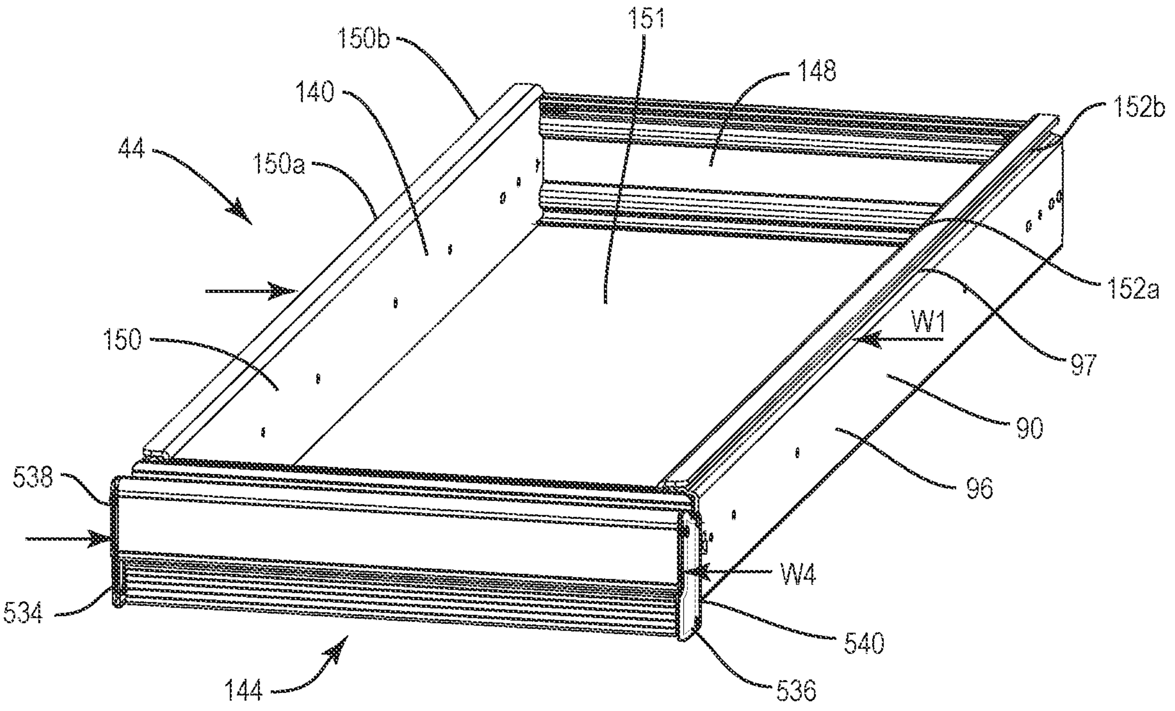
FIG. 3 is a perspective view, in part phantom, of a drawer assembly of the shelving system shown in FIG. 1.

To move drawer assembly 44 from the latched or closed orientation to the unlatched or open orientation, a pushing motion is applied to portion 160 of handle 144. The pushing motion moves portion 160 relative to portion 158 of handle 144 in the direction shown by arrow A in FIG. 7 such that portion 160 rotates relative to portion 158 in the direction shown by arrow B in FIG. 7 and portion 230 (which is already in direct contact with bottom surfaces 268, 294, or bottom surfaces of flanges 260, 286 when sleeves 262, 288 are omitted) applies an upward force to bottom surfaces 268, 294 (or bottom surfaces of flanges 260, 286 when sleeves 262, 288 are omitted) to move ends 248, 274 in the direction shown by arrow E in FIG. 7 such that flange 258 is spaced apart from flange 102 (flange 258 is positioned above flange 102) to allow drawer 140 to translate relative to member 88 along axis X1 in the direction shown by arrow F in FIG. 33 and flange 284 is spaced apart from flange 114 (flange 284 is positioned above flange 114) to allow drawer 140 to translate relative to member 90 along axis X2 in the direction shown by arrow G in FIG. 34. That is, when drawer assembly 44 is in the unlatched or open orientation, flange 258 is positioned above flange 102 (between flange 102 and a top lip 95 of member 88) such that flange 258 will not come into contact with flange 102 as flange 258 passes by flange 102 when drawer 140 moves in the direction shown arrow F in FIG. 33 relative to member 88 and flange 284 is positioned above flange 114 (between flange 114 and a top lip 97 of member 90) such that flange 284 will not come into contact with flange 114 as flange 284 passes flange 114 when drawer 140 moves in the direction shown arrow F in FIG. 33 relative to member 90. Drawer 140 is coupled with members 88, 90, 124, 126 such that lip 95 of member 88 is positioned below flange **150*a* of wall 150, as shown in FIG. 4, and lip 97 of member 90 is positioned below flange 152*a* of wall 152, as shown in FIG. 3. In some embodiments, drawer 140 is coupled with members 88, 90, 124, 126 such that a top surface 95*a* of lip 95 is spaced apart from a bottom surface 150*a*1 of flange 150*a*, as shown in FIG. 7, and a top surface of lip 97 is spaced apart from a bottom surface of flange 152*a*. When drawer assembly 44 is the unlatched or open orientation, wall 214 of portion 160 directly engages wall 166 of portion 158, as shown in FIG. 7**.

When the pushing motion that was applied to portion 160 of handle 144 to move portion 160 relative to portion 158 of handle 144 in the direction shown by arrow A in FIG. 7 ceases and is removed, portion 160 rotates relative to portion 158 in the direction shown by arrow E in FIG. 7 such that wall 214 moves relative to portion 158 in the direction shown by arrow H in FIG. 7 to return drawer assembly 44 to the latched or closed orientation. That is, unless the pushing motion is applied to portion 160 of handle 144 to rotate wall 214 relative to portion 158, drawer assembly 44 will be in the latched or closed orientation.

In operation and use, system 40 may be provided in any area where items are temporarily stored and later retrieved. For example, system 40 is adapted for use in a building, such as, for example, a warehouse to temporarily store various items for later retrieval. System 40 is also adapted for use within various types of vehicles, as discussed herein. In some embodiments, frame 42 may include one or more mounting brackets, such as, for example, brackets 300, 302 that are configured to be mounted to surfaces of a structure, such as, for example, a building or vehicle, to secure frame 42 to the structure.

Drawer assemblies 44 are each biased to the latched or closed orientation, as discussed herein. As such, system 40 is provided for use with drawer assemblies 44 each in the latched or closed orientation such that drawers 140 of each of drawer assembly 44 are unable to translate relative to frame 42 along respective axes X1, X2 of each drawer assembly 44.

One of drawer assemblies 44 may be moved from the latched or closed orientation to the unlatched or open orientation while the other drawer assemblies remain in the latched or closed orientation. To move one of drawer assemblies 44 may be moved from the latched or closed orientation to the unlatched or open orientation, a pushing motion is applied to portion 160 of handle 144 of the one drawer assembly 44. The pushing motion moves wall 214 of portion 160 relative to portion 158 of handle 144 in the direction shown by arrow A in FIG. 7 such that wall 214 rotates relative to portion 158 in the direction shown by arrow B in FIG. 7 and portion 130 (which is already in direct contact with bottom surfaces 268, 294, or bottom surfaces of flanges 260, 286 when sleeves 262, 288 are omitted) applies a force in the direction shown by arrow I in FIG. 7 to bottom surfaces 268, 294 (or bottom surfaces of flanges 260, 286 when sleeves 262, 288 are omitted) to move ends 248, 274 in the direction shown by arrow I in FIG. 7 such that flange 258 is spaced apart from flange 102 (flange 258 is positioned above flange 102) to allow drawer 140 to translate relative to member 88 along axis X1 in the direction shown by arrow F in FIG. 33 and flange 284 is spaced apart from flange 114 (flange 284 is positioned above flange 114) to allow drawer 140 to translate relative to member 90 along axis X2 in the direction shown by arrow G in FIG. 34. A driver or delivery person may then remove contents such as packages, equipment or tools that were being temporarily stored in drawer 140 from drawer 140. Once the desired contents are removed from drawer 140, the driver or delivery person may then translate drawer 140 relative to members 88, 90 along axes X1, X2 in the direction shown by arrow C in FIG. 33 until drawer 140 is fully closed (drawer 140 is unable to further translate relative to members 88, 90 along axes X1, X2 in the direction shown by arrow C in FIG. 33).

In some embodiments, the driver or delivery person may cease the pushing motion prior to translating drawer 140 relative to members 88, 90 along axes X1, X2 in the direction shown by arrow C such that the upward force applied to bottom surfaces 268, 294 (or bottom surfaces of flanges 260, 286 when sleeves 262, 288 are omitted) in the direction shown by arrow I in FIG. 7 is removed, before translating drawer 140 relative to members 88, 90 along axes X1, X2 in the direction shown by arrow C in FIG. 33. The driver or deliver person may then translate drawer 140 relative to members 88, 90 along axes X1, X2 in the direction shown by arrow C after the upward force applied to bottom surfaces 268, 294 (or bottom surfaces of flanges 260, 286 when sleeves 262, 288 are omitted) is removed. As drawer 140 translates relative to members 88, 90 along axes X1, X2 in the direction shown by arrow C in FIG. 33, flange 258 slides over flange 102 and flange 284 slides over flange 114 as flange 258 moves passed flange 102 and flange 284 moves passed flange 114. That is, portion 104 of flange 102 and portion 116 flange 114 are angled relative to axes X1, X2, respectively, such that portions 104, 116 are inclined ramps that allow flange 258 to slide over flange 102 and flange 284 to slide over flange 114 as flange 258 moves passed flange 102 and flange 284 moves passed flange 114. Once drawer 140 is fully closed, drawer assembly 44 will automatically be in the latched or closed orientation because drawer assembly 44 is biased to the latched or closed orientation.

In some embodiments, the driver or delivery person may maintain the pushing motion as drawer 140 translates relative to members 88, 90 along axes X1, X2 in the direction shown by arrow C in FIG. 33 such that the upward force applied to bottom surfaces 268, 294 (or bottom surfaces of flanges 260, 286 when sleeves 262, 288 are omitted) in the direction shown by arrow I in FIG. 7 remains as drawer 140 translates relative to members 88, 90 along axes X1, X2 in the direction shown by arrow E. However, this is not required since flange 260 will slide over flange 102 and flange 284 will slide over flange 114 as drawer 140 translates relative to members 88, 90 along axes X1, X2 in the direction shown by arrow E if the upward force applied to bottom surfaces 268, 294 (or bottom surfaces of flanges 260, 286 when sleeves 262, 288 are omitted) is removed. Once drawer 140 is fully closed, the driver or delivery person may cease the pushing motion prior to translating drawer 140 relative to members 88, 90 along axes X1, X2 in the direction shown by arrow C in FIG. 33 such that the upward force applied to bottom surfaces 268, 294 (or bottom surfaces of flanges 260, 286 when sleeves 262, 288 are omitted) is removed, which will return drawer assembly 44 to the latched or closed orientation because drawer assembly 44 is biased to the latched or closed orientation.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A drawer release comprising:

a member defining a longitudinal axis and including a first locking element;

a drawer comprising a frame and a handle coupled to the frame, the handle comprising a first portion and a second portion that is rotatable relative to the first portion about a horizontal axis that extends perpendicular to the longitudinal axis; and a drawer release rotatably coupled to the drawer and comprising a second locking element, wherein a pushing motion applied to the second portion moves the drawer release from a first orientation in which the second locking element directly engages the first locking element and the drawer is prevented from sliding relative to the member, to a second orientation in which the second locking element is spaced apart from the first locking element and the drawer is slidable relative to the member, wherein the second portion directly engages the drawer release when the drawer release is in both the first and second orientations, wherein the handle includes a third locking element that engages a bottom surface of a portion of the second locking element such that rotation of the third locking element about the horizontal axis pushes the portion of the second locking element upwardly to move the drawer release from the first orientation to the second orientation, and wherein the drawer release is free of springs.

2. A drawer release recited in claim 1, wherein the handle engages the drawer release when the drawer release is in both the first and second orientations.

3. A drawer release recited in claim 1, wherein the first portion is fixed relative to the frame.

4. A drawer release recited in claim 1, wherein the third locking element engages the portion of the second locking element as the drawer release moves between the first and second orientations.

5. A drawer release as recited in claim 1, wherein the first portion of the handle is fixed to the frame and includes a channel, the second portion of the handle having a first end rotatably positioned in the channel and an opposite second end that engages the second locking element as the drawer release moves from the first orientation to the second orientation.

6. A drawer release as recited in claim 1, wherein the third locking element moves vertically to move the drawer release from the first orientation to the second orientation.

7. A drawer release as recited in claim 1, wherein the member defines a channel, the drawer including a rail coupled to the side of the frame, the rail being positioned in the channel, the second locking element being coupled to the rail.

8. A drawer release as recited in claim 1, wherein the member includes opposite inner and outer surfaces, the inner surface defining a channel, the drawer including a rail coupled to the side of the frame, the rail being positioned in the channel, the first locking element including a flange that extends into the channel.

9. A drawer release as recited in claim 8, wherein the outer surface defines a top surface of the flange and the inner surface defines an opposite bottom surface of the flange.

10. A drawer assembly comprising the drawer release recited in claim 1, wherein the drawer release is not biased to the first orientation.

11. A drawer assembly comprising the drawer release recited in claim 1, wherein the drawer release is not biased to the first orientation by a spring of the drawer assembly that engages the third locking element.

12. A drawer release as recited in claim 1, wherein the second locking element includes a first lever and a second lever that is coupled to the first lever.

13. A drawer release as recited in claim 12, wherein the first lever is a monolithic component.

14. A drawer release as recited in claim 12, wherein the handle engages the first lever and the second lever engages the first locking element when the drawer release is in the first orientation.

15. A drawer release as recited in claim 12, wherein rotation of the first lever causes the second lever to rotate.

16. A drawer assembly comprising:

a member defining a longitudinal axis and including a first locking element;

a drawer comprising a frame and a handle having a maximum width that is greater than a maximum width of the frame, the handle comprising a first portion and a second portion that is rotatable relative to the first portion about a horizontal axis that extends perpendicular to the longitudinal axis; and a drawer release directly engaging the handle and comprising a second locking element, wherein a pushing motion applied to the second portion moves the drawer release from a first orientation in which the second locking element is spaced apart from the first locking element to allow the drawer to translate relative to the member, to a second orientation in which the second locking element directly engages the first locking element to prevent the drawer from translating relative to the member, the handle directly engaging the drawer release when the drawer release is in both the first and second orientations, wherein the second portion directly engages the drawer release when the drawer release is in both the first and second orientations, wherein the handle includes a third locking element that engages a bottom surface of a portion of the second locking element such that rotation of the third locking element about a horizontal axis that extends perpendicular to the longitudinal axis pushes the portion of the second locking element upwardly to move the drawer release from the first orientation to the second orientation, and wherein the drawer release is free of springs.

17. A drawer assembly comprising:

a member defining a longitudinal axis and including a first locking element;

a drawer comprising a frame and a handle having a maximum width that is greater than a maximum width of the frame, the handle comprising a first portion and a second portion that is rotatable relative to the first portion about a horizontal axis that extends perpendicular to the longitudinal axis; and a drawer release directly engaging the handle, the drawer release being rotatably coupled to the drawer and comprising a second locking element, wherein a pushing motion applied to the second portion moves the drawer release from a first orientation in which the second locking element directly engages the first locking element to prevent the drawer from translating relative to the member, to a second orientation in which the second locking element is spaced apart from the first locking element to allow the drawer to translate relative to the member, the second portion directly engaging the drawer release when the drawer release is in both the first and second orientations, wherein the second portion directly engages the drawer release when the drawer release is in both the first and second orientations, wherein the handle includes a third locking element that engages a bottom surface of a portion of the second locking element such that rotation of the third locking element about a horizontal axis that extends perpendicular to the longitudinal axis pushes the portion of the second locking element upwardly to move the drawer release from the first orientation to the second orientation, and wherein the drawer release is free of springs.

* * * * *